US010895357B2

(12) United States Patent
Ishida et al.

(10) Patent No.: US 10,895,357 B2
(45) Date of Patent: Jan. 19, 2021

(54) VEHICLE LAMP

(71) Applicant: KOITO MANUFACTURING CO., LTD., Tokyo (JP)

(72) Inventors: Hiroyuki Ishida, Shizuoka (JP); Tatsuma Kitazawa, Shizuoka (JP); Takahiko Honda, Shizuoka (JP); Takayoshi Ishizuka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/537,767

(22) Filed: Aug. 12, 2019

(65) Prior Publication Data

US 2019/0360652 A1 Nov. 28, 2019

Related U.S. Application Data

(63) Continuation of application No. 15/502,039, filed as application No. PCT/JP2015/072415 on Aug. 6, 2015, now abandoned.

(30) Foreign Application Priority Data

Aug. 7, 2014 (JP) ................................ 2014-161154
Aug. 7, 2014 (JP) ................................ 2014-161155

(51) Int. Cl.
  *F21S 41/00* (2018.01)
  *B60Q 1/04* (2006.01)
  (Continued)

(52) U.S. Cl.
  CPC ............. *F21S 41/147* (2018.01); *F21S 41/00* (2018.01); *F21S 41/148* (2018.01);
  (Continued)

(58) Field of Classification Search
  None
  See application file for complete search history.

(56) References Cited

U.S. PATENT DOCUMENTS 5,938,323 A * 8/1999 McMahan ............. F21S 41/321
                                                        362/539
7,156,544 B2   1/2007 Ishida
              (Continued)

FOREIGN PATENT DOCUMENTS

CN       101055066 A     10/2007
CN       101097049 A      1/2008
              (Continued)

OTHER PUBLICATIONS

Communication dated Aug. 22, 2019, from the Japanese Patent Office in counterpart application No. 2018-227884.
(Continued)

*Primary Examiner* — Sharon E Payne
(74) *Attorney, Agent, or Firm* — Sughrue Mion, PLLC

(57) ABSTRACT

A vehicle lamp forms an additional high-beam light distribution pattern with light emitted though a projection lens from a plurality of light emitting elements. The plurality of light emitting elements are disposed to be aligned in a transverse direction below a rear focal point of the projection lens and can be lit individually. The vehicle lamp forms an additional light distribution pattern by lighting the plurality of light emitting elements at the same time to form a high-beam light distribution pattern. In addition, the vehicle lamp forms another additional light distribution pattern where a part of the additional light distribution pattern is omitted by selectively lighting a part of the plurality of light emitting elements so as to form an intermediate light distribution pattern.

6 Claims, 26 Drawing Sheets

(51) Int. Cl.
*F21S 41/147* (2018.01)
*F21S 41/663* (2018.01)
*F21S 41/36* (2018.01)
*F21S 41/365* (2018.01)
*F21S 41/40* (2018.01)
*F21S 41/148* (2018.01)
*F21S 41/151* (2018.01)
*F21S 41/30* (2018.01)
*F21S 41/27* (2018.01)
*F21S 41/255* (2018.01)
*F21S 41/43* (2018.01)
*F21S 41/60* (2018.01)

(52) U.S. Cl.
CPC .......... *F21S 41/151* (2018.01); *F21S 41/255* (2018.01); *F21S 41/27* (2018.01); *F21S 41/30* (2018.01); *F21S 41/36* (2018.01); *F21S 41/365* (2018.01); *F21S 41/40* (2018.01); *F21S 41/43* (2018.01); *F21S 41/60* (2018.01); *F21S 41/663* (2018.01); *B60Q 1/04* (2013.01)

(56) References Cited

U.S. PATENT DOCUMENTS

| | | | |
|---|---|---|---|
| 7,824,088 | B2 | 11/2010 | Iwasaki |
| 8,210,727 | B2 | 7/2012 | Suzuki |
| 8,858,050 | B2 | 10/2014 | Yamamoto |
| 8,899,806 | B2 | 12/2014 | Anzai |
| 2005/0068787 | A1 | 3/2005 | Ishida |
| 2006/0120094 | A1 | 6/2006 | Tsukamoto et al. |
| 2007/0201241 | A1* | 8/2007 | Komatsu ............... F21S 41/155 362/545 |
| 2007/0236953 | A1 | 10/2007 | Nakazawa et al. |
| 2008/0013333 | A1 | 1/2008 | Koizumi et al. |
| 2008/0062709 | A1 | 3/2008 | Mochizuki et al. |
| 2008/0112180 | A1 | 5/2008 | Okada |
| 2008/0285297 | A1 | 11/2008 | Ishida |
| 2009/0196060 | A1 | 8/2009 | Sazuka et al. |
| 2009/0284981 | A1 | 11/2009 | Iwasaki |
| 2010/0177525 | A1 | 7/2010 | Iwasaki |
| 2012/0140503 | A1 | 6/2012 | Ahn et al. |
| 2012/0262935 | A1* | 10/2012 | Yamamoto ............ F21S 41/147 362/516 |
| 2013/0135885 | A1 | 5/2013 | Anzai |
| 2013/0215634 | A1 | 8/2013 | Tseng |
| 2015/0009700 | A1 | 1/2015 | Yamamoto |
| 2015/0219301 | A1* | 8/2015 | Honda .................. F21S 41/147 362/517 |
| 2016/0040848 | A1 | 2/2016 | Tsukamoto |

FOREIGN PATENT DOCUMENTS

| | | |
|---|---|---|
| CN | 101178160 A | 5/2008 |
| CN | 101581427 A | 11/2009 |
| CN | 101776238 A | 7/2010 |
| CN | 102434835 A | 5/2012 |
| CN | 102537801 A | 7/2012 |
| DE | 102009049458 A1 | 4/2011 |
| DE | 102015215200 A1 | 2/2016 |
| EP | 2436969 A2 | 4/2012 |
| EP | 2523022 A1 | 11/2012 |
| JP | 2005108554 A | 4/2005 |
| JP | 2006107955 A | 4/2006 |
| JP | 2008-71555 A | 3/2008 |
| JP | 2008-177130 A | 7/2008 |
| JP | 2011249080 A | 12/2011 |
| JP | 2012226860 A | 11/2012 |
| JP | 2014103060 A | 6/2014 |
| JP | 2014120342 A | 6/2014 |
| WO | 2013111722 A1 | 8/2013 |

OTHER PUBLICATIONS

Office Action dated Sep. 18, 2019 by the Japanese Patent Office in counterpart Japanese Patent Application No. 2018-248153.
Communication dated Jun. 19, 2018, issued by P.R. China State Intellectual Property Office in counterpart application No. 201580042407.3.
Communication dated Mar. 7, 2019, from the State Intellectual Property Office of People's Republic of China in counterpart Application No. 201580042407.3.
International Search Report and Written Opinion, issued by International Searching Authority in corresponding International Application No. PCT/JP2015/072415, dated Oct. 27, 2015 (PCT/ISA/210, PCT/ISA/220 & PCT/ISA/237).
Communication dated Feb. 19, 2018, issued by the European Patent Office in counterpart European Patent Application No. 15829456.1.

* cited by examiner

VEHICLE LAMP

CROSS-REFERENCE TO RELATED APPLICATIONS

This application is a continuation of co-pending U.S. application Ser. No. 15/502,039 filed Feb. 6, 2017, which is a National Stage of International Application No. PCT/JP2015/072415 filed Aug. 6, 2015, claiming priority based on JP Application Nos. 2014-161155 and 2014-161154, both filed Aug. 7, 2014, the contents of all of which are incorporated herein by reference in their entirety.

TECHNICAL FIELD

The present invention relates to a projector-type vehicle lamp.

BACKGROUND ART

There is known a projector-type vehicle lamp which emits light forwards from a light source disposed behind a projection lens, through the projection lens.

Patent Document 1 describes a vehicle lamp which includes a lamp unit for forming an additional high-beam light distribution pattern to be added to a low-beam light distribution pattern. The lamp unit includes a plurality of light emitting elements which are disposed along a rear focal plane of a projection lens, and the shape of the additional light distribution pattern can be changed as required by individually lighting the plurality of light emitting elements.

PRIOR ART DOCUMENT

Patent Document

Patent Document 1: JP-A-2011-249080

SUMMARY OF THE INVENTION

Problem to be Solved

In the vehicle lamp described in Patent Document 1, the above-described lamp unit is disposed separately from a lamp unit for forming the low-beam light distribution pattern, so that the vehicle lamp becomes larger in size.

The present invention has been made in view of the above circumstances, and an object of the present invention is to provide a vehicle lamp configured to selectively perform high beam illumination and low beam illumination where an additional high-beam light distribution pattern can be formed by a plurality of types of illumination patterns with a compact configuration.

Means for Solving the Problem

The present invention achieves the above object by devising a configuration where low beam illumination and high beam illumination are selectively performed by a projector-type optical system using a single projection lens.

According to a first aspect of the invention, there is provided a vehicle lamp configured to selectively perform low beam illumination and high beam illumination, wherein the vehicle lamp comprises a projection lens, and a light source which is disposed behind the projection lens and is configured to emit light forwards through the projection lens, wherein a shade and a plurality of light emitting elements are disposed behind the projection lens, the shade being configured to cut off a part of light which is emitted from the light source to be directed towards the projection lens to form a low-beam light distribution pattern, the plurality of light emitting elements being configured to emit light which enters the projection lens to form an additional high-beam light distribution pattern to be added to the low-beam light distribution pattern, and wherein the plurality of light emitting elements are disposed to be aligned in a transverse direction below a rear focal point of the projecting lens and are configured to be lit individually.

The vehicle lamp according to the first aspect of the present invention may be configured such that light from the light source is incident on the projection lens as direct light or light from the light source is reflected to be incident on the projection lens.

The type of "light source" is not limited. For example, light emitting elements such as light emitting diodes or laser diodes or light source bulbs may be be adopted.

The specific configuration and arrangement of the "light emitting elements" is not particularly limited as long as the light emitting elements disposed to be aligned in the transverse direction below the focal point of the projection lens and are configured to be lit individually.

According to a second aspect of the present invention, there is provided a vehicle lamp configured to selectively perform low beam illumination and high beam illumination, wherein the vehicle lamp comprises a projection lens, and a light source which is disposed behind the projection lens and is configured to emit light forwards through the projection lens, wherein a shade and a plurality of light emitting units are disposed behind the projection lens, the shade being configured to cut off a part of light which is emitted from the light source to be directed towards the projection lens to form a low-beam light distribution pattern, the plurality of light emitting units being configured to emit light which enters the projection lens to form an additional high-beam light distribution pattern to be added to the low-beam light distribution pattern, and wherein the plurality of light emitting units are disposed to be aligned in a transverse direction below a rear focal point of the projecting lens and are configured to be lit individually.

The specific configuration and arrangement of the "light emitting units" is not particularly limited as long as the light emitting units are disposed to be aligned in the transverse direction below the focal point of the projection lens and configured to be lit individually. For example, a configuration including a light source and a reflector or a configuration including a light source and a lens may be adopted.

The description reading that the "light emitting units" are disposed below the "rear focal point of the projection lens" means that light emitted from the "light emitting units" passes the rear focal plane of the projection lens below the rear focal point of the projection lens.

Advantages of the Invention

The vehicle lamp according to the first aspect of the present invention is configured as the projector-type lamp which selectively performs low beam illumination and high beam illumination and forms the additional high-beam light distribution pattern by allowing light from the plurality of light emitting elements to be incident on the projection lens.

The plurality of light emitting elements are disposed to be aligned in the left-right direction below the rear focal point of the projection lens and is configured to be lit individually. Hence, the following operational effects can be obtained.

That is, the high-beam light distribution pattern can be formed by forming the additional light distribution pattern by lighting the plurality of light emitting elements at the same time. An additional light distribution pattern where a part of the additional light distribution pattern is omitted can be formed by selectively lighting a part of the plurality of light emitting elements so as to form an intermediate light distribution pattern can be formed which has an intermediate shape between the low-beam light distribution pattern and the high-beam light distribution pattern.

Moreover, the intermediate light distribution pattern can be realized by the projector-type optical system using the single projection lens.

According to the present invention, in the vehicle lamp configured to selectively perform low beam illumination and high beam illumination, the additional high-beam light distribution pattern can be formed by the plurality of types of illumination patterns with the compact configuration.

In the above-described configuration, by disposing the plurality of light emitting elements while being displaced in a front-rear direction from the rear focal plane of the projection lens, light distribution patterns formed by the individual light emitting elements can be formed such that the adjacent light distribution patterns are partially overlapped with each other. Additionally, the discontinuity of the low-beam light distribution pattern from the additional light distribution pattern can be prevented at the portion of the low-beam light distribution pattern where a cut-off line is formed.

In the above-described configuration, the following operational effects can be obtained by forming the shade so as to extend obliquely upwards and rearwards from the vicinity of the rear focal plane of the projection lens and additionally disposing the plurality of light emitting elements behind a front end edge thereof.

That is, the plurality of light emitting elements can be disposed in the position which is nearly as high as an optical axis of the projection lens, and therefore, the additional light distribution pattern can be formed as the light distribution pattern which is relatively bright in a lower end area thereof.

In the above-described configuration, the following operational effects can be obtained by disposing a first reflector configured to reflect a part of light emitted from the light emitting elements towards the projection lens behind an upper area of the projection lens.

That is, light emitted from the individual light emitting elements and reflected on the first reflector to be incident on the projection lens is emitted forwards from the projection lens as light directed downwards, and therefore, the low-beam light distribution pattern and the additional light distribution pattern can be partially overlapped with each other at the portion where the cut-off line of the low-beam light distribution pattern is formed. This can enhance the continuousness of the low-beam light distribution pattern with the additional light distribution pattern.

In place of adopting this configuration, a second reflector may disposed behind a lower area of the projection lens and a third reflector is disposed behind the upper area of the projection lens, so that a part of light emitted from the individual light emitting elements can be reflected sequentially by the second and third reflectors to be incident on the projection lens.

According to this configuration, the quantity of light which is reflected by the third reflector to be incident on the projection lens can be increased, so that it is possible to enhance the brightness of the portion of the additional light distribution pattern which is overlapped with the low-beam light pattern.

In the above-described configuration, as a configuration of the projection lens, a configuration may be adopted in which a rear focal point in the upper area thereof is positioned below a rear focal point in a general area other than the upper area.

According to this configuration, the low-beam light distribution pattern can be partially overlapped with the additional light distribution pattern at the portion of the low-beam light distribution pattern where the cut-off line is formed, so that it is possible to enhance the continuousness of the low-beam light distribution pattern with the additional light distribution pattern.

In addition, the vehicle lamp according to the second aspect of the present invention is configured as the projector-type lamp which selectively perform low beam illumination and high beam illumination and forms the additional high-beam light distribution pattern by allowing light from the plurality of light emitting units to be incident on the projection lens. The plurality of light emitting units are disposed to be aligned in the left-right direction below the rear focal point of the projection lens and configured to be lit individually, so that the following operational effects can be obtained.

That is, the high-beam light distribution pattern can be formed by forming the additional light distribution pattern by lighting the plurality of light emitting units at the same time. In addition, an additional light distribution pattern where a part of the additional light distribution pattern is omitted can be formed by selectively lighting a part of the plurality of light emitting units, so that an intermediate light distribution pattern can be formed which has an intermediate shape between the low-beam light distribution pattern and the high-beam light distribution pattern.

Moreover, this intermediate light distribution pattern can be realized by the projector-type optical system using the single projection lens.

According to the second aspect of the invention, in the vehicle lamp configured to selectively perform low beam illumination and high beam illumination, the additional high-beam light distribution pattern can be formed by the plurality of types of illumination patterns with the compact configuration.

In the above-described configuration, the configuration of each light emitting unit can be made simple by configuring each light emitting unit to include a light emitting element and a reflector which reflects light emitted from the light emitting element towards the projection lens.

In this case, as a configuration of the reflector, by allowing the reflector to include a first reflection plane which extends obliquely downwards and rearwards from the vicinity of the rear focal plane of the projection lens and a second reflection plane which reflects light emitted from the light emitting element towards the first reflection plane, the light emitted from the light emitting element is allowed to be incident on the projection lens with higher efficiency.

In this case, by adopting a configuration in which the first reflection plane is formed such that the position of the front end edge thereof coincides with the position of the front end edge of the shade, it is possible to prevent the discontinuous of the low-beam light distribution pattern from the additional light distribution pattern at the portion where the cut-off line of the low-beam light distribution pattern is formed.

In the above-described configuration, as a configuration of the projection lens, by adopting a configuration in which a rear focal point of the upper area thereof is positioned below a rear focal point of a general area other than the upper area, the low-beam light distribution pattern is allowed to be partially overlapped with the additional light distribution pattern at the portion where the cut-off line of the low-beam light distribution pattern is formed, so that it is possible to enhance the continuousness of the low-beam light distribution pattern with the additional light distribution pattern.

DETAILED DESCRIPTION OF EMBODIMENTS

First Embodiment

Hereinafter, a first embodiment of the present invention will be described with reference to the drawings.

Figure 1:
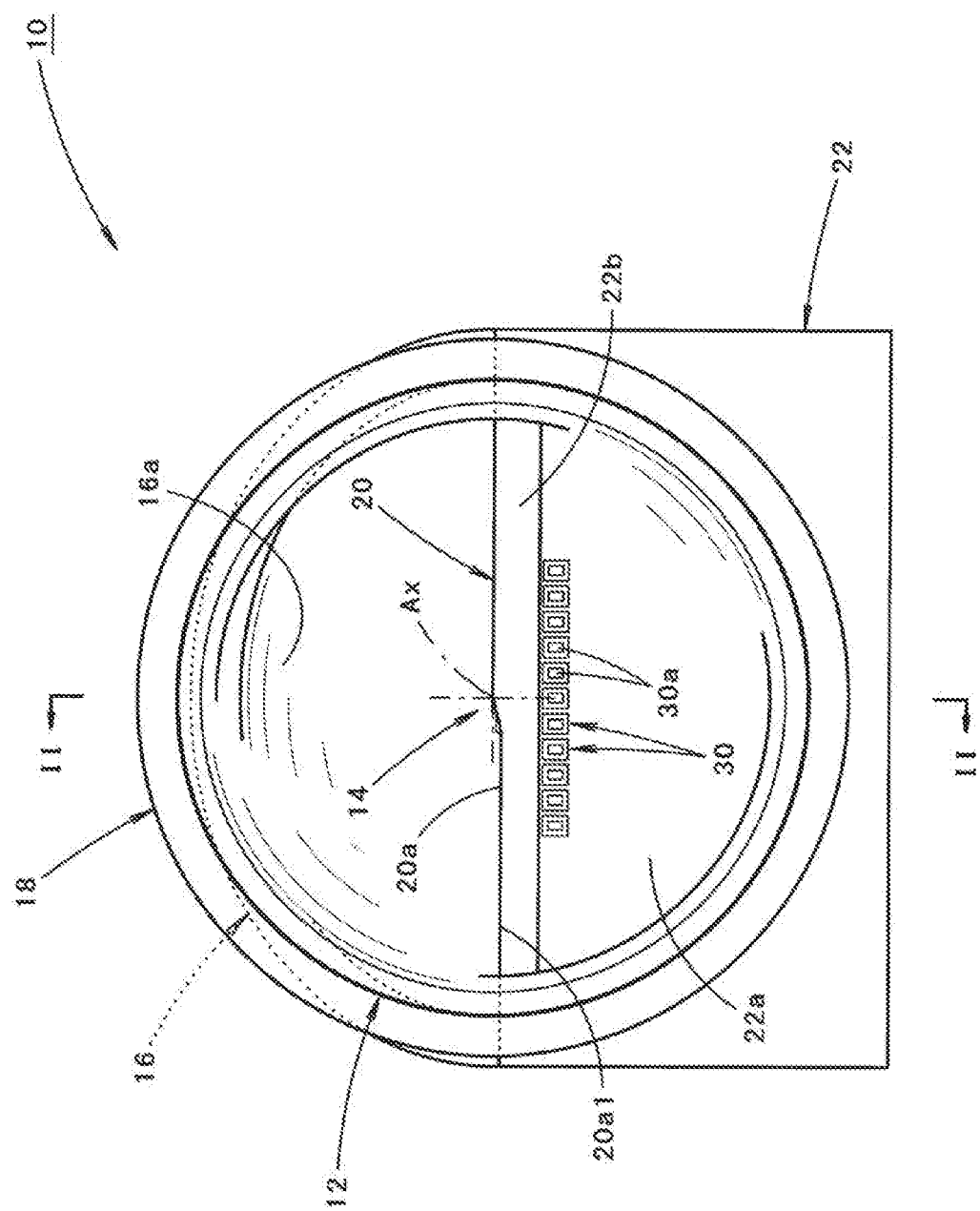
FIG. 1 is a front view showing a vehicle lamp according to a first embodiment of the present invention.
Figure 2:
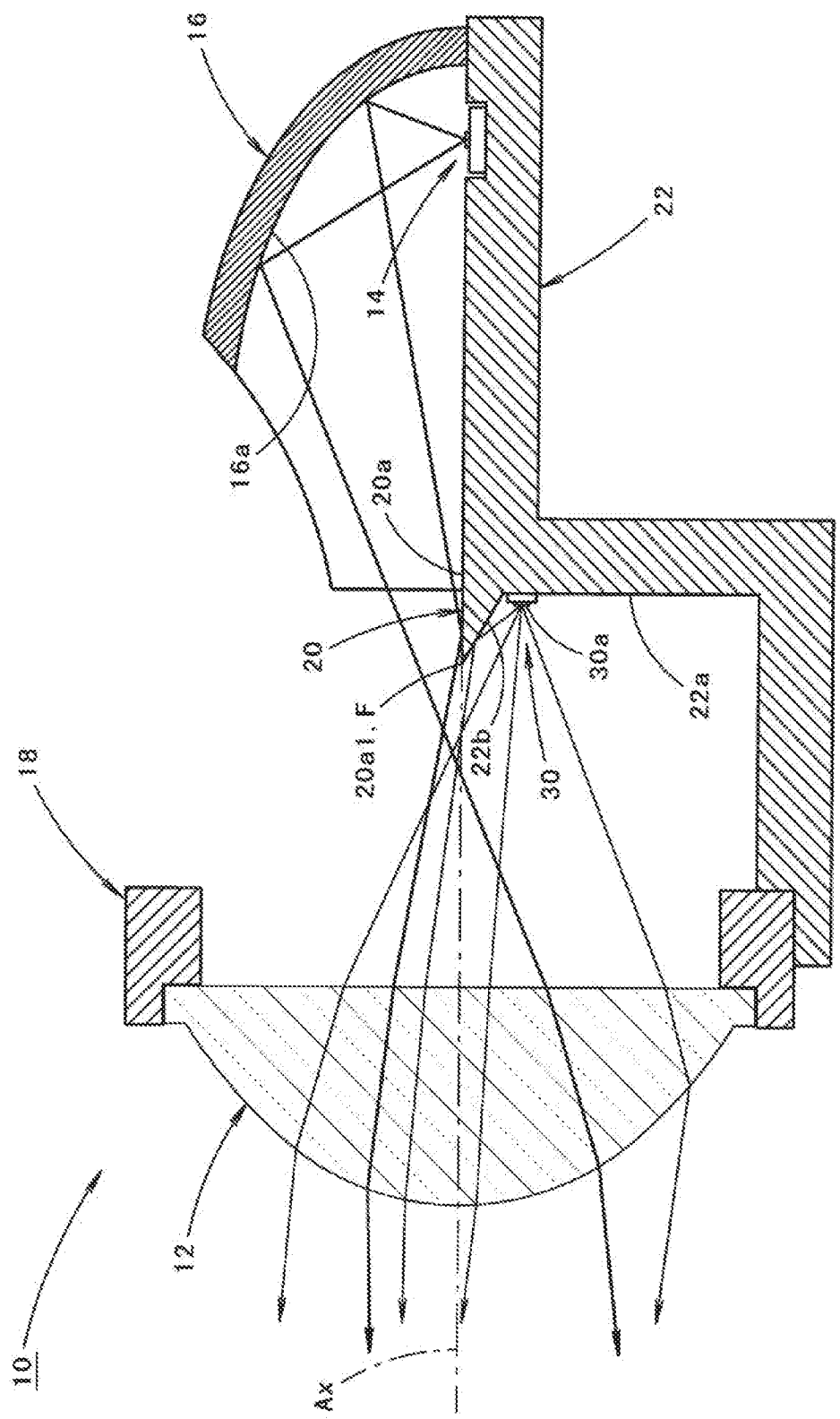
FIG. 2 is a sectional view taken along a line II-II in FIG. 1.
Figure 3:
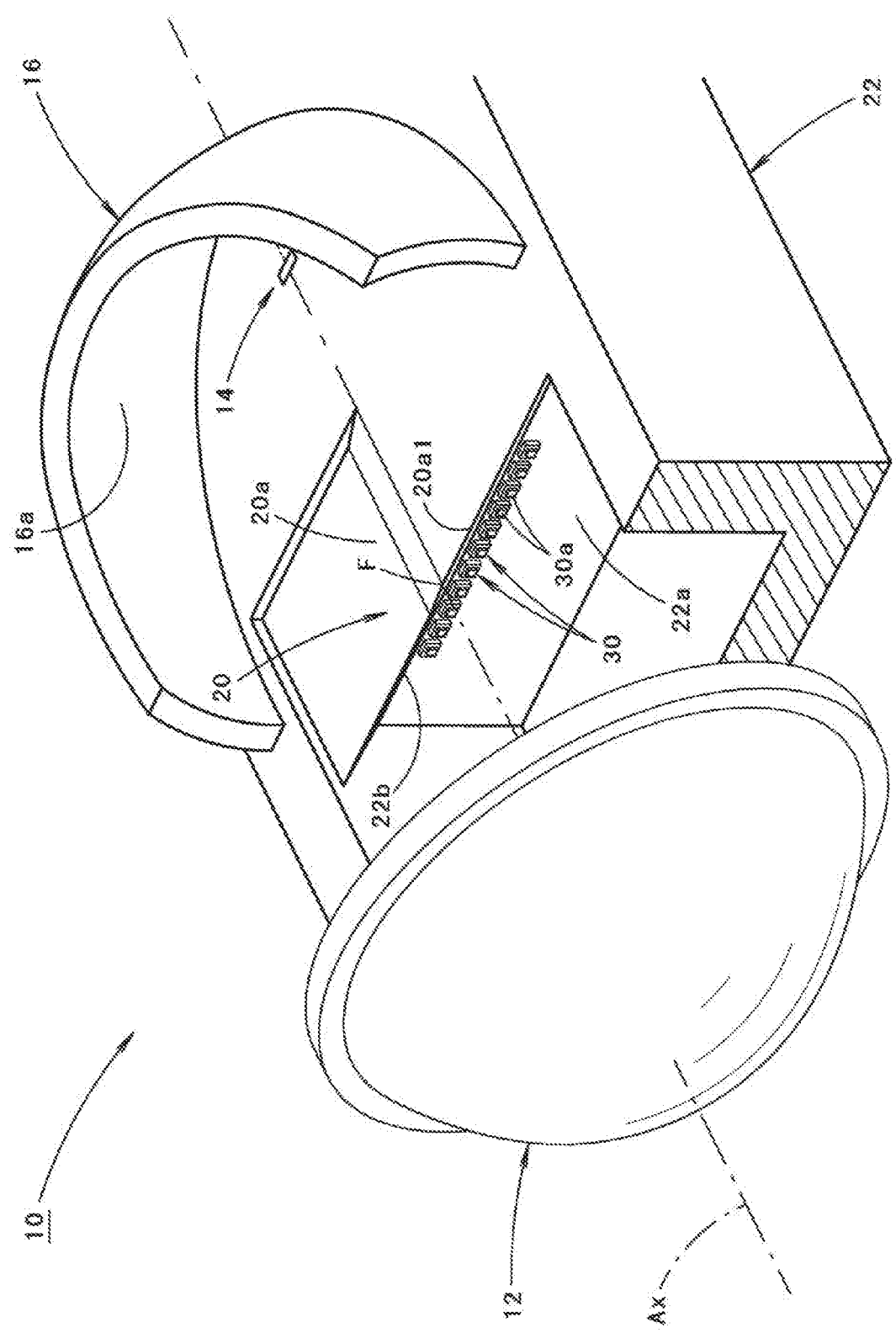
FIG. 3 is a perspective view showing main constituent elements of the vehicle lamp according to the first embodiment.

FIG. 1 is a front view showing a vehicle lamp 10 according to a first embodiment of the present invention. FIG. 2 is a sectional view taken along a line II-II in FIG. 1, and FIG. 3 is a perspective view showing main constituent elements of the vehicle lamp 10.

As shown in these figures, the vehicle lamp 10 according to this embodiment is a headlamp configured to selectively perform low beam illumination and high beam illumination and is configured as a projector-type lamp unit.

Specifically, the vehicle lamp 10 includes a projection lens 12 having an optical axis Ax which extends in a front-rear or longitudinal direction of the vehicle, a light emitting element 14 which functions as a light source disposed behind a rear focal point F of the projection lens 12, and a reflector 16 which is disposed so as to cover the light emitting element 14 from the above and which is configured to reflect light from the light emitting element 14 towards the projection lens 12.

Further, the vehicle lamp 10 includes a shade 20 which cuts off a part of light emitted from the light emitting element 14 to be directed towards the projection lens 12 to form a low-beam light distribution pattern, and a plurality of light emitting elements 30 which emit light to be incident on the projection lens 12 to form an additional high-beam light distribution pattern to be added to the low-beam light distribution pattern.

In this vehicle lamp 10, the optical axis Ax is inclined slightly downwards with respect to the longitudinal direction of the vehicle in a state where an optical axis adjustment is completed.

Hereinafter, a specific configuration of the vehicle lamp 10 will be described.

The projection lens 12 is a piano-convex aspheric lens which includes a convex front surface and a plane rear surface and projects a light source image formed on a rear focal plane which is a focal plane including a rear focal point F thereof as a reverted image onto a imaginary vertical screen ahead of the lamp.

The projection lens 12 is supported on a lens holder 18 at an outer circumferential flange portion thereof. Then, the lens holder 18 is supported on a base member 22.

The light emitting element 14 is a white light emitting diode and has a transversely long rectangular light emitting surface. The light emitting element 14 is disposed to face upwards with its light emitting surface lying on a horizontal plane including the optical axis Ax. This light emitting element 14 is supported on the base member 22.

A reflecting surface 16a of the reflector 16 is made up of a substantially ellipsoidal curved surface having a major axis which is substantially coaxial with the optical axis Ax and a first focal point at a light emitting center of the light emitting element 14. The eccentricity of the reflecting surface 16a is set to increase gradually from a vertical section to a horizontal section. By adopting this configuration, the reflector 16 converges light from the light emitting element 14 to a point which is positioned slightly ahead of the rear focal point F in the vertical section and moves the converging position further forwards in the horizontal section. The reflector 16 is supported on the base member 22.

The shade 20 has an upwardly facing reflecting surface 20a which cuts off a part of light emitted from the light emitting element 14 and then reflected on the reflector 16, and which then reflects upwards the light so cut off. Then, the light reflected on the upwardly facing reflecting surface 20a is incident on the projection lens 12 and is then emitted from the projection lens 12 as a dipped beam.

This shade 20 is formed integrally with the base member 22. The upwardly facing reflecting mirror 20a of the shade 20 is formed by applying a mirror finish on an upper surface of the base member 22 through aluminum deposition.

In the upwardly facing reflecting surface 20a, a left area which is positioned on a left side (a right side in the front view of the lamp) of the optical axis Ax is made up of a horizontal surface which includes the optical axis Ax, while a right area which is positioned on a right side of the optical axis Ax is made up of a horizontal surface which is lowered from the left area via a short sloping surface. A front end edge 20a1 of the upwardly facing reflecting surface 20a is formed to extend both leftwards and rightwards from the rear focal point F.

The plurality of light emitting elements 30 are disposed to be aligned in a left-right or transverse direction below the rear focal point F of the projection lens 12 and are configured to be lit individually by an illumination control circuit (not shown).

In this embodiment, eleven light emitting elements 30 each having a similar configuration are disposed leftwards and rightwards at equal intervals in the transverse direction from a position directly below the optical axis Ax as a center of the arrangement.

The light emitting elements 30 are white light emitting diodes and each have a vertically long rectangular light emitting surface 30a. The light emitting elements 30 are supported on a front wall surface 22a of the base member 22 in a position which is spaced away obliquely downwards and rearwards from the front end edge 20a1 of the upwardly facing reflecting surface 20a of the shade 20 with their light emitting surfaces 30a facing the front of the lamp.

A plane reflecting surface 22b is formed at an upper end portion of the front wall surface 22a of the base member 22 to reflect a part of light emitted from the individual light emitting elements 30 to the front. This reflecting surface 22b is formed to extend obliquely downwards and rearwards from the front end edge 20a1 of the upwardly facing reflecting surface 20a of the shade 20 to a position on the front wall surface 22a of the base member 22 above the eleven light emitting elements 30.

Light emitted from the individual light emitting elements 30 to be directed towards the projection lens 12 passes the rear focal plane while being divergent to some extent, and ranges of fluxes of light emitted from the adjacent light emitting elements 30 are slightly overlapped with each other. In this case, a part of light emitted from the individual light emitting elements 30 is reflected on the reflecting surface 22b of the base member 22 into light to be directed towards the projection lens 12.

Figure 4:
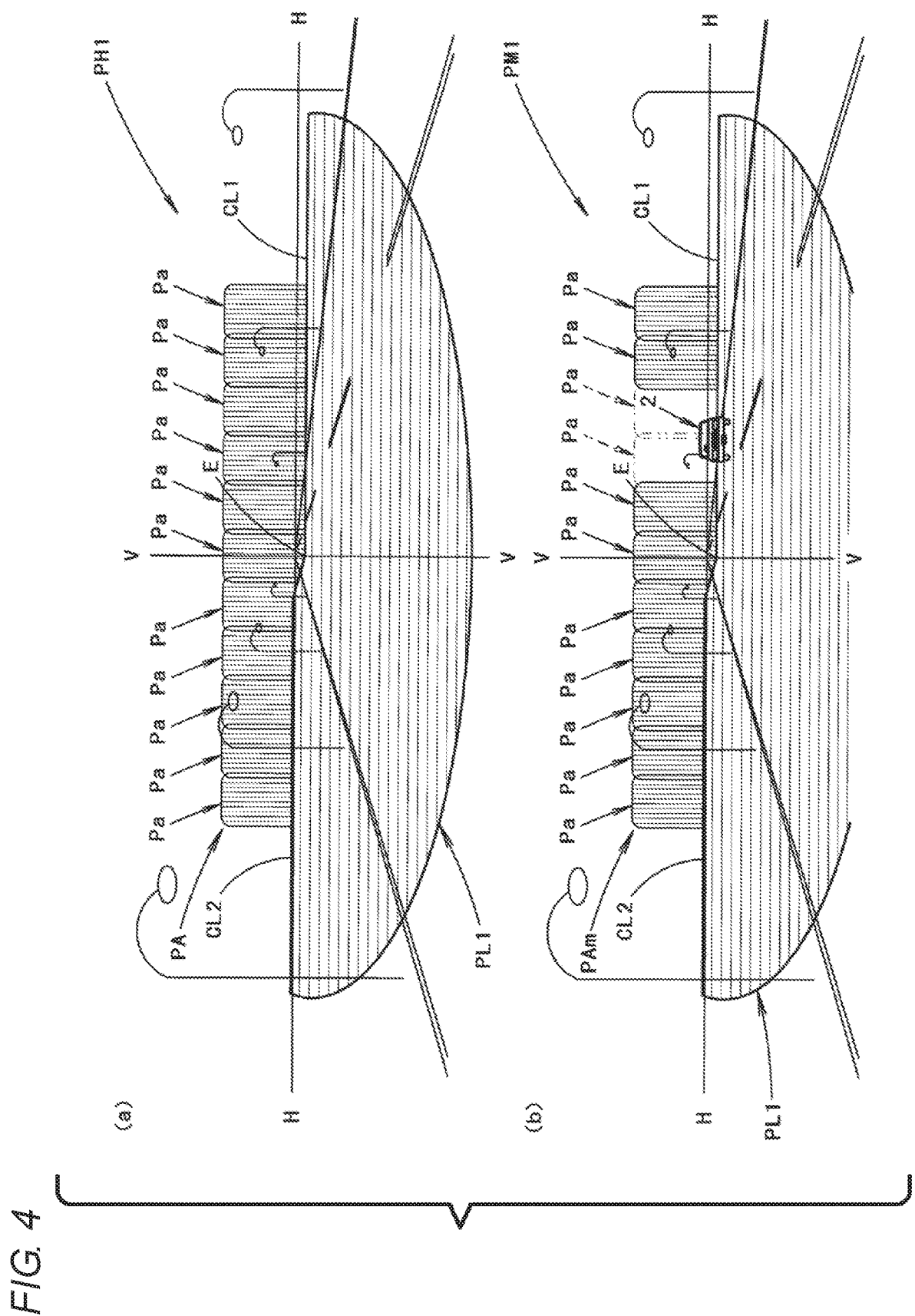
FIG. 4 is a diagram showing light distribution patterns in a perspective manner which are formed on an imaginary vertical screen disposed in a position at 25 meters ahead of the vehicle lamp according to the first embodiment by light emitted forwards from the vehicle lamp.

FIG. 4 is a diagram showing light distribution patterns in a perspective manner which are formed on an imaginary vertical screen disposed in a position at 25 meters ahead of the vehicle by light emitted forwards from the vehicle lamp 10. FIG. 4(a) is a view showing a high-beam light distribution pattern PH1, and FIG. 4(b) is a view showing an intermediate light distribution pattern PM1.

The high-beam light distribution pattern PH1 shown in FIG. 4(a) is formed as a combined light distribution pattern of the low-beam light distribution pattern PL1 and an additional high-beam pattern PA.

The low-beam light distribution pattern PL1 is a low-beam light distribution pattern for right-hand drive vehicles basically designed to drive on the left and has cut-off lines CL1, CL2 which shift in level in the transverse direction along an upper end edge of the light distribution pattern. These cut-off lines CL1, CL2 extend in a horizontal direction while shifting in level in the transverse direction from a V-V line as a boundary which passes vertically an H-V which is a vanishing point in the direction of the front of the lamp. A portion lying on a right side of the V-V line which corresponds to an oncoming vehicle's drive lane is formed as a lower cut-off line CL1, and a portion lying on a left side of the V-V line which corresponds to the own vehicle's drive lane is formed as an upper cut-off line CL2 which is raised one level up from the lower cut-off line CL1 via a sloping portion.

The low-beam light distribution pattern PL1 is formed by projecting a light source image of the light emitting element 14 which is formed on the rear focal plane of the projection lens 12 by light emitted from the light emitting element 14 and then reflected on the reflector 16 on to the imaginary vertical screen as a reverted projected image by the projection lens 12. The cut-off lines CL1, CL2 of the low-beam light distribution pattern PL1 are formed as a reverted projected image of the front end edge 20a1 of the upwardly facing reflecting surface 20a of the shade 20.

In the low-beam light distribution pattern PL1, an elbow point E, which is a point of intersection between the lower cut-off line CL1 and the V-V line, is positioned about 0.5° to 0.6° downwards below the H-V.

In the high-beam light distribution pattern PH1, the additional light distribution pattern PA is formed additionally as a transversely long light distribution pattern which expands upwards from the cut-off lines CL1, CL2 to thereby illuminate widely a driving path ahead of the vehicle.

The additional light distribution pattern PA is formed as a combined light distribution pattern of eleven light distribution patterns Pa.

The light distribution patterns Pa are light distribution patterns which are formed as reverted projected images of light source images of the individual light emitting elements 30 which are formed on the rear focal plane of the projection lens 12 by light emitted individually from the light emitting elements 30.

In this case, the individual light distribution patterns Pa each has a substantially rectangular shape which is slightly longer in the vertical direction. This is because the light emitting surface 30a of each light emitting element 30 has a vertically long rectangular external shape.

The light distribution patterns Pa are formed such that adjacent light distribution patterns Pa are slightly overlapped with each other. This is because the light emitting elements 30 are disposed further rearwards than the rear focal plane of the projection lens 12 and ranges of fluxes of light which are emitted from the adjacent light emitting elements 30 to pass the rear focal plane of the projection lens 12 are slightly overlapped with each other.

Lower end edges of the individual light distribution patterns Pa coincide in position with the cut-off lines CL1, CL2. This is because the reflecting surface 22b which reflects forwards a part of light emitted from the individual light emitting elements 30 is formed to extend obliquely downwards and rearwards from the front end edge 20a1 of the upwardly facing reflecting surface 20a of the shade 20.

The intermediate light distribution pattern PM1 shown in FIG. 4(b) is a light distribution pattern having an additional light distribution pattern PAm which is partially not illuminated, in place of the additional light distribution pattern PA which forms the high-beam light distribution pattern PH1.

Specifically, the additional light distribution pattern PAm represents a light distribution pattern where the third and fourth light distribution patterns Pa from the right are omitted in the eleven light distribution patterns Pa. The light distribution pattern PAm is formed by turning off the third and fourth light emitting elements 30 from the left in the eleven light emitting elements 30.

By forming the intermediate light distribution pattern PM1, the driving path ahead of the vehicle is attempted to be illuminated as widely as possible to such an extent that light emitted from the vehicle lamp 10 is not directed to an oncoming vehicle 2 to dazzle the driver of the oncoming vehicle 2.

The shape of the additional light distribution pattern PAm is controlled to change as the position of the oncoming vehicle 2 changes by sequentially changing the light emitting elements 30 to be turned off, so that the driving path ahead of the vehicle is kept illuminated as widely as possible to such an extent that the driver of the oncoming vehicle 2 is not dazzled.

The presence of the oncoming vehicle 2 is detected by an onboard camera (not shown). In addition, if a preceding vehicle presents on the driving path ahead of the vehicle or a pedestrian walks on the shoulder of the driving path, the onboard camera detects them, so that the preceding vehicle or the pedestrian is prevented from being dazzled by turning off a part of the light distribution patterns Pa.

Next, the operational effects of the first embodiment will be described.

The vehicle lamp 10 according to the first embodiment is configured as the projector-type lamp which selectively performs low beam illumination and high beam illumination, wherein light emitted from the eleven light emitting elements 30 is incident on the projection lens 12 to form the additional high-beam light distribution pattern PA. In this case, the eleven light emitting elements 30 are disposed to be aligned in the transverse direction below the rear focal point F of the projection lens 12 and are configured to be lit individually, so that the following operational effect can be obtained.

That is, the high-beam light distribution pattern PH1 can be formed by forming the additional light distribution pattern PA while lighting the eleven light emitting elements 30 at the same time. In addition, by selectively lighting a part of the eleven light emitting elements 30, the additional light distribution pattern PAm can be formed where a part of the additional light distribution pattern PA is omitted, so that the intermediate light distribution pattern PM1 can be formed which is between the low-beam light distribution pattern PL and the high-beam light distribution pattern PH1.

Moreover, this can be realized by the projector-type optical system using the single projection lens 12.

Accordingly, in this embodiment, in the vehicle lamp 10 which selectively performs low beam illumination and high beam illumination, the additional high-beam light distribution patterns PA, PAm can be formed by the plurality of types of light distribution patterns with the compact configuration.

In the embodiment, since the eleven light emitting elements 30 are disposed to be displaced rearwards from the rear focal plane of the projection lens 12, in the light distribution patterns Pa which are formed by the individual light emitting elements 30, the adjacent light distribution patterns Pa can be slightly overlapped with each other. Further, the low-beam light distribution pattern PL1 and the additional light distribution pattern PA are not separated at the portion where the cut-off lines CL1. CL2 are formed.

Moreover, in this embodiment, the reflecting surface 22b which reflects forwards a part of light emitted from the individual light emitting elements 30 is formed at the upper end portion of the front wall surface 22a of the base member 22 to extend obliquely downwards and rearwards from the front end edge 20a1 of the upwardly facing reflecting surface 20a of the shade 20 to the position on the front wall surface 22a of the base member 22 above the eleven light emitting elements 30. This allows the formation of the light distribution patterns Pa with a luminous intensity distribution in which the luminous intensity is high at the lower end areas thereof consequently, the additional light distribution pattern PA which is formed as the combined light distribution of those light distribution patterns Pa can be formed as the light distribution pattern in which the areas along the cut-off lines CL1, CL2 are brightly illuminated, which can be suitable for formation of the high-beam light distribution pattern PH1.

It is noted that the reflecting surface 22b may not be formed.

In the above-described embodiment, while the vehicle lamp 10 is described as including the eleven light emitting elements 30, the vehicle lamp 10 may include any other number of light emitting elements 30.

In the above-described embodiment, while the individual light emitting elements 30 are described as being disposed behind the rear focal point F of the projection lens 12, the light emitting elements 30 may be disposed ahead of the rear focal point F.

Next, modified examples of the first embodiment will be described.

Firstly, a first modified example of the first embodiment will be described.

Figure 5:
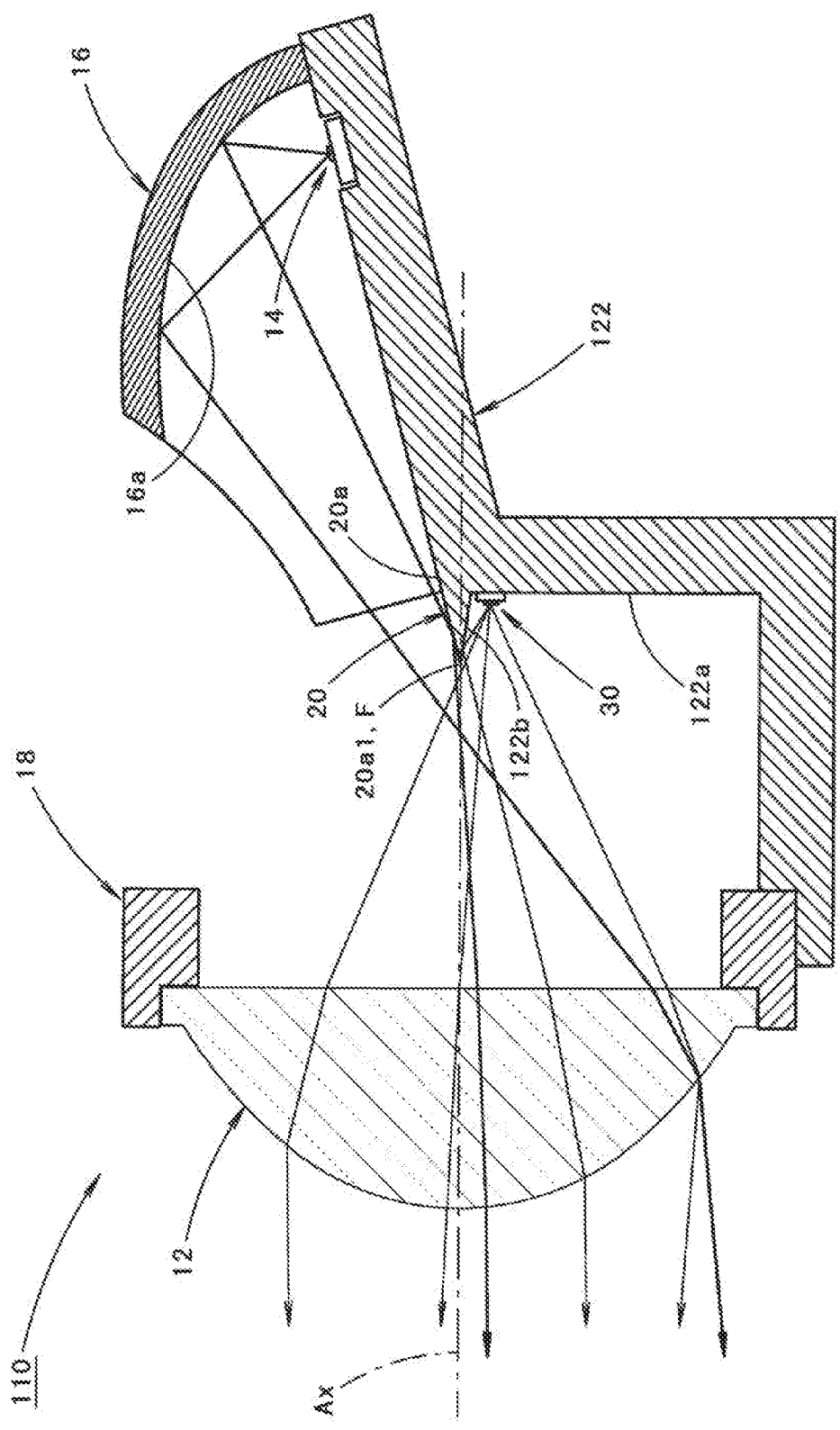
FIG. 5 is a view similar to FIG. 2, which shows a vehicle lamp according to a first modified example of the first embodiment.

FIG. 5 is a view similar to FIG. 2, which shows a vehicle lamp 110 according to this modified example.

As shown in FIG. 5, a basic configuration of the vehicle lamp 110 is similar to that of the vehicle lamp 10 of the above-described embodiment but is different in the arrangement of the light emitting element 14, the reflector 16 and the shade 20, the reflector 16 and the shade 20 and in the shape of the base member 122 as well.

That is, in the shade 20 of this modified example, an upwardly facing reflecting surface 20a thereof is formed to extend obliquely upwards and rearwards from the vicinity of the rear focal plane of the projection lens 12. In this case, an inclination angle of the upwardly facing reflecting surface 20a from a horizontal plane is set at a value of about 10 to 30°, and the position of the front end edge 20a1 of the upwardly facing reflecting surface 20a is set substantially at the same position as the position of the upwardly facing reflecting surface 20a of the above-described embodiment.

The configurations of the light emitting element 14 and the reflector 16 are similar to those in the above-described embodiment. However, the light emitting element 14 and the reflector 16 are disposed to be inclined at an angle corresponding to the inclination angle of the upwardly facing reflecting surface 20a of the shade 20 from the horizontal plane. It is noted that with the inclination angle of this magnitude, light emitted from the light emitting element 14 and then reflected by the reflector 16 passes an area on the rear focal plane of the projection lens 12 which is almost the same as that in the above-described embodiment.

In this modified example, the eleven light emitting elements 30 are also disposed to be aligned at equal intervals in the transverse direction below the rear focal point F of the projection lens 12, and the eleven light emitting elements 30 are configured to be lit individually.

The eleven light emitting elements 30 are supported on a front wall surface 122a of the base member 122 but are supported in a higher position (that is, a position closer to an optical axis Ax) than the corresponding position in the above-described embodiment.

In this modified example, a plane reflecting surface 122b is formed at an upper end portion of the front wall surface 122a of the base member 122 to reflect forwards a part of light emitted from the individual light emitting elements 30. This reflecting surface 122b is formed to extend obliquely downwards and rearwards from the front end edge 20a1 of the upwardly facing reflecting surface 20a of the shade 20 to a position on the front wall surface 122a of the base member 122 above the eleven light emitting elements 30. In this case, an inclination angle of the reflecting surface 122b is a smaller value than that in the above-described embodiment.

Figure 6:
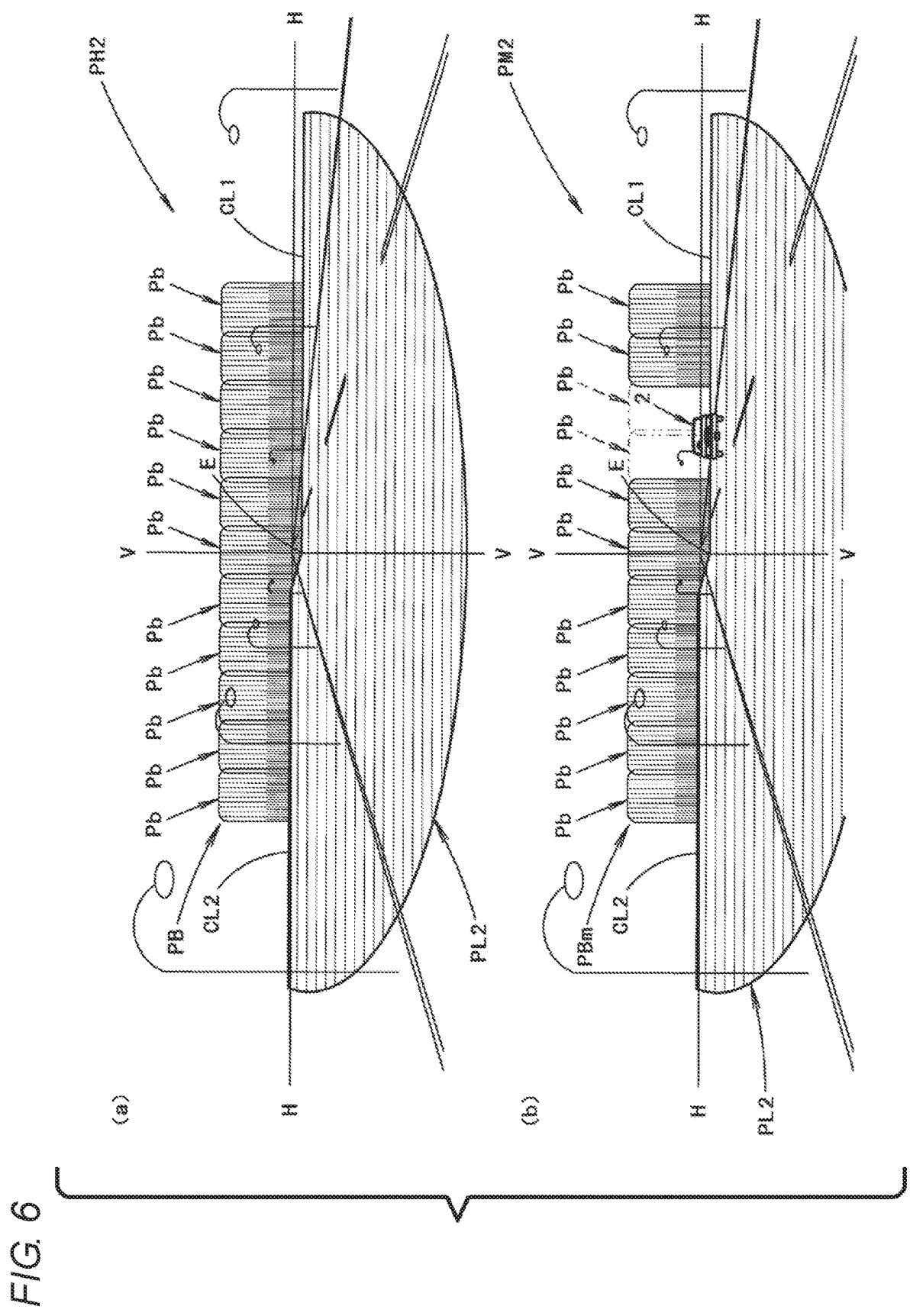
FIG. 6 is a view similar to FIG. 4, which shows operations the modified example of the first embodiment.

FIG. 6 is a view showing light distribution patterns in a perspective manner which are formed on the imaginary vertical screen by light emitted forwards from the vehicle lamp 10. FIG. 6(a) shows a high-beam light distribution pattern PH2, and FIG. 6(b) shows an intermediate light distribution pattern PM2.

The high-beam light distribution pattern PH2 shown in FIG. 6(a) is formed as a combined light distribution pattern of a low-beam light distribution pattern PL2 and an additional high-beam light distribution pattern PB.

The low-beam light distribution pattern PL2 has substantially the same shape as that of the low-beam light distribution pattern PL1 of the above-described embodiment.

The additional light distribution pattern PB is formed as a combined light distribution patter of eleven light distribution patterns Pb.

The light distribution patterns Pb are light distribution patterns which are formed as reverted projected images of light source images of the light emitting elements 30 which are formed on the rear focal plane of the projection lens 12 by light emitted from the individual light emitting elements 30.

The additional light distribution pattern PB represents a light distribution pattern whose lower end area is brighter than that of the additional light distribution pattern PA of the above-described embodiment. This is because the light emitting elements 30 are positioned in the higher position than the corresponding position in the above-described embodiment and because the reflecting surface 122b which extends obliquely downwards and rearwards from the front end edge 20a1 of the upwardly facing reflecting surface 20a of the shade 20 is formed to be inclined at the smaller inclination angle than that in the above-described embodiment.

The intermediate light distribution pattern PM2 shown in FIG. 6(b) is a light distribution pattern having an additional light distribution pattern PBm which is partially not illuminated, in place of the additional light distribution pattern PB which forms the high-beam light distribution pattern PH2.

In this modified example, the additional high-beam light distribution patterns PB, PBm can be also formed by the plurality of types of light distribution patterns with the compact configuration.

In addition, by adopting the configuration of this modified example, the additional light distribution pattern PB can represent the light distribution pattern whose end area is bright, so that the continuity of the additional light distribution pattern PB with the low-beam light distribution pattern PL2 can be enhanced.

Next, a second modified example of the first embodiment will be described.

Figure 7:
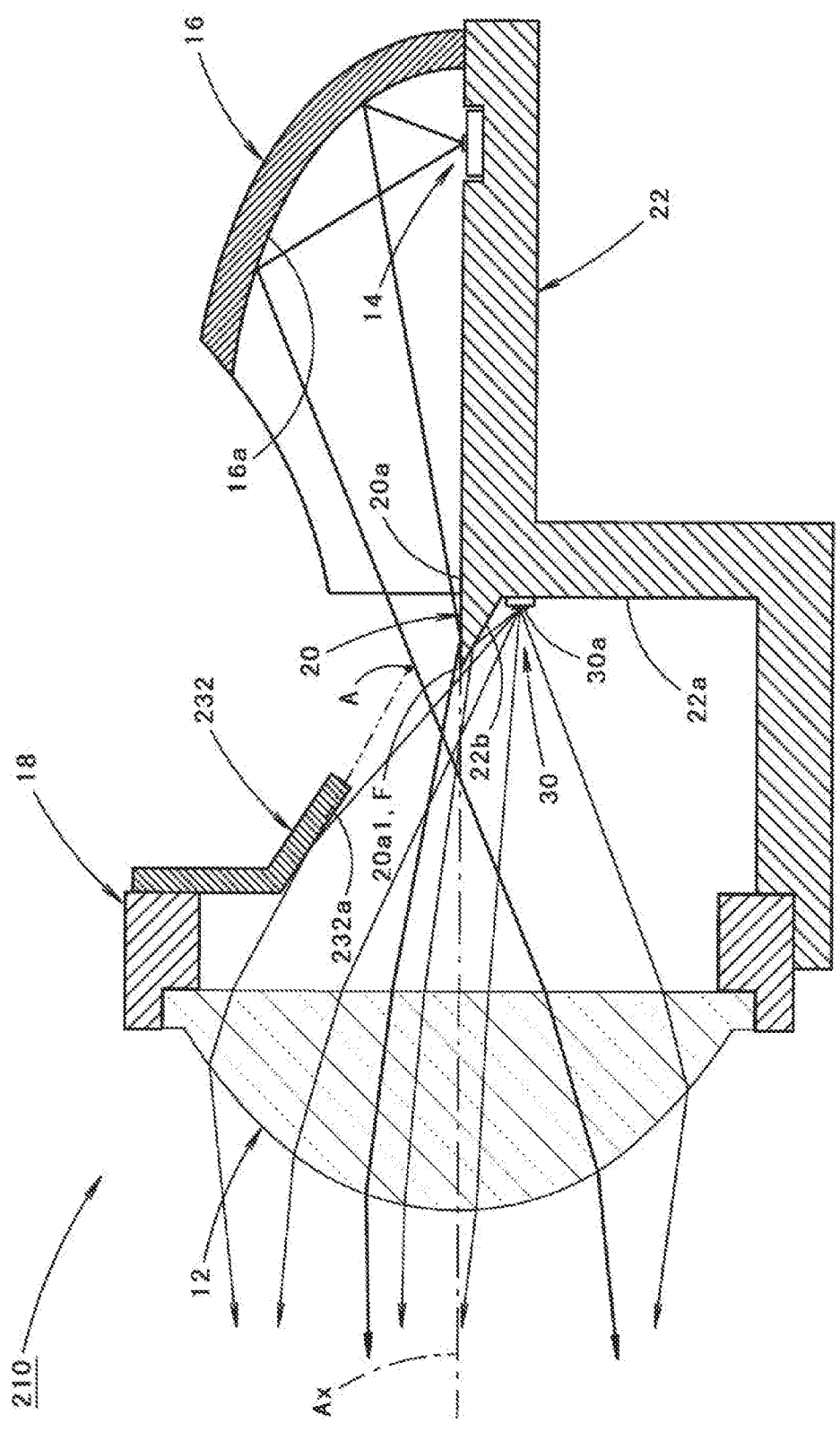
FIG. 7 is a view similar to FIG. 2, which shows a vehicle lamp according to a second modified example of the first embodiment.

FIG. 7 is a view similar to FIG. 2, which shows a vehicle lamp 210 according to this modified example.

As shown in FIG. 7, a basic configuration of the vehicle lamp 210 is similar to that of the vehicle lamp 10 of the above-described embodiment but is different in that a first reflector 232 is additionally disposed.

The first reflector 232 is disposed behind an upper area of the projection lens 12 and is supported on the lens holder 18. The first reflector 232 has a plane reflecting surface 232a which extends obliquely downwards and rearwards. The first reflector 232 reflects a part of light emitted from individual light emitting elements 30 towards the projection lens 12 on the reflecting surface 232a.

In this case, an inclination angle of the reflecting surface 232a is set such that light emitted from the light emitting elements 30 and then reflected on the reflecting surface 232a is incident on the projection lens 12 as light which passes the rear focal plane of the projection lens 12 in a height position of a point A which is positioned above the optical axis Ax. Then, the reflected light from the reflecting surface 232a which enters the projection lens 12 in the above-described manner is emitted from the projection lens 12 to the front as light which is directed slightly downwards.

Figure 9:
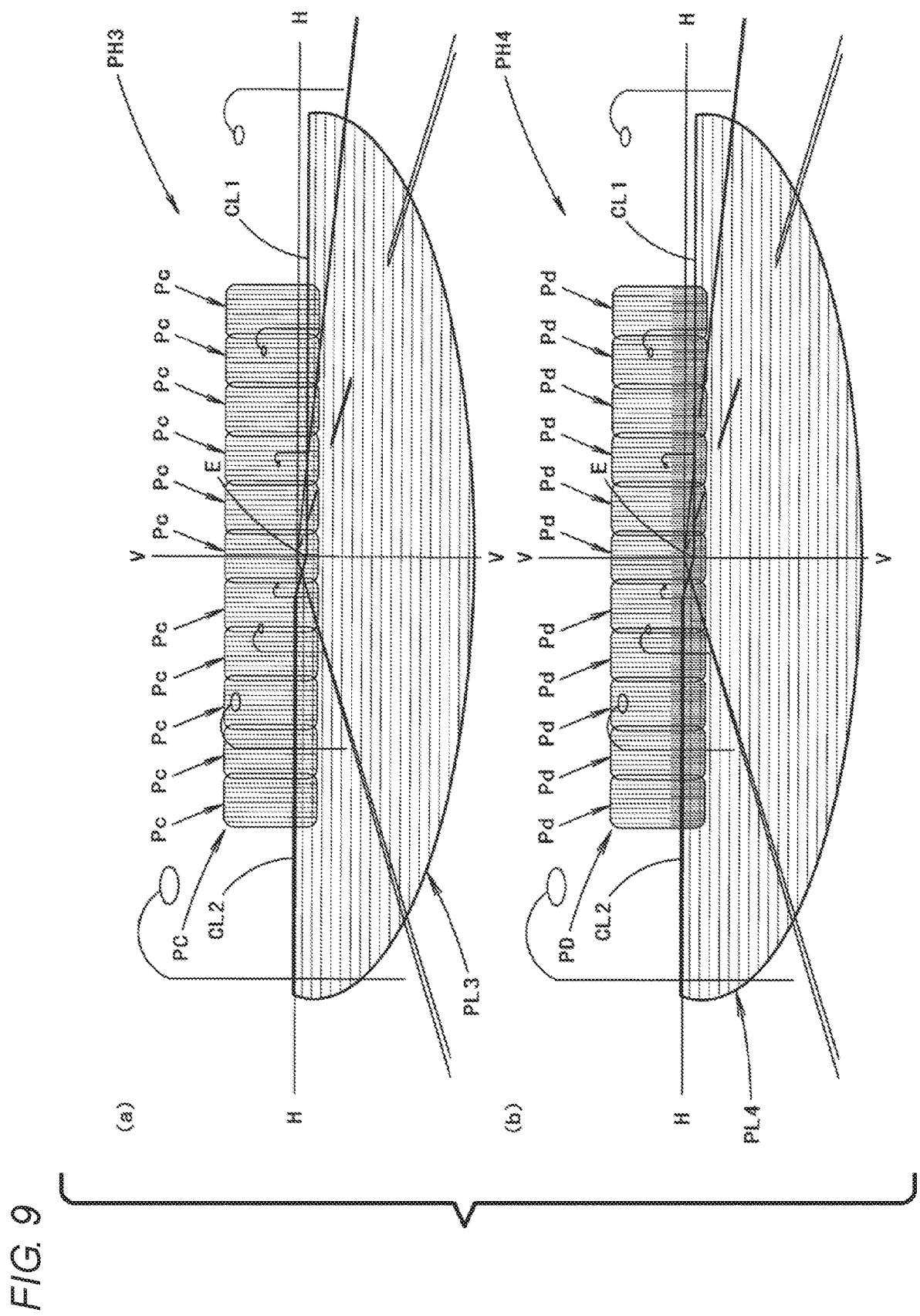
FIG. 9 is a view similar to FIG. 4, which shows operations of the second and third modified examples.

FIG. 9(a) is a view showing in a high-beam light distribution pattern H3 in a perspective manner which is formed on the imaginary vertical screen by light emitted ahead of the vehicle lamp 210.

This high-beam light distribution pattern PH3 is formed as a combined light distribution pattern of the low-beam light distribution pattern PL3 and an additional high-beam light distribution pattern PC.

The low-beam light distribution pattern PL3 has a similar shape to that of the low-beam light distribution pattern PL of the above-described embodiment.

The additional light distribution pattern PC is formed as a combined light distribution pattern of eleven light distribution patterns Pc.

The light distribution patterns Pc are light distribution patterns which are formed as reverted projected images of light source images of the light emitting elements 30 which are formed on the rear focal plane of the projection lens 12 by light emitted from the individual light emitting elements 30.

In this case, the light distribution patterns Pc are formed in the same shape and arrangement as those of the light distribution patterns Pa of the above-described embodiment. However, the lower end edges extend to a position slightly further downwards than cut-off lines CL1, CL2. This is because light emitted from the individual light emitting elements 30 and then reflected on the first reflector 232 which is disposed behind the upper area of the projection lens 12 is emitted from the projection lens 12 as light directed slightly downwards.

In this modified example, an intermediate light distribution pattern can be formed such that a part of the additional light distribution pattern PC is omitted from the high-beam light distribution pattern PH3 by lighting individually the light emitting elements 30.

In this modified example, the operational effects similar to that of the first embodiment can be obtained.

By adopting the configuration of this modified example, in the high-beam light distribution pattern PH3, the low-beam light distribution pattern PL3 and the additional light distribution pattern PC can be partially overlapped with each other at the portion where the cut-off lines CL1, CL2 are formed, so that the continuity between the low-beam light distribution pattern PL3 and the additional light distribution pattern PC can be enhanced further. This is also true in relation to the intermediate light distribution pattern.

Next, a third modified example of the first embodiment will be described.

Figure 8:
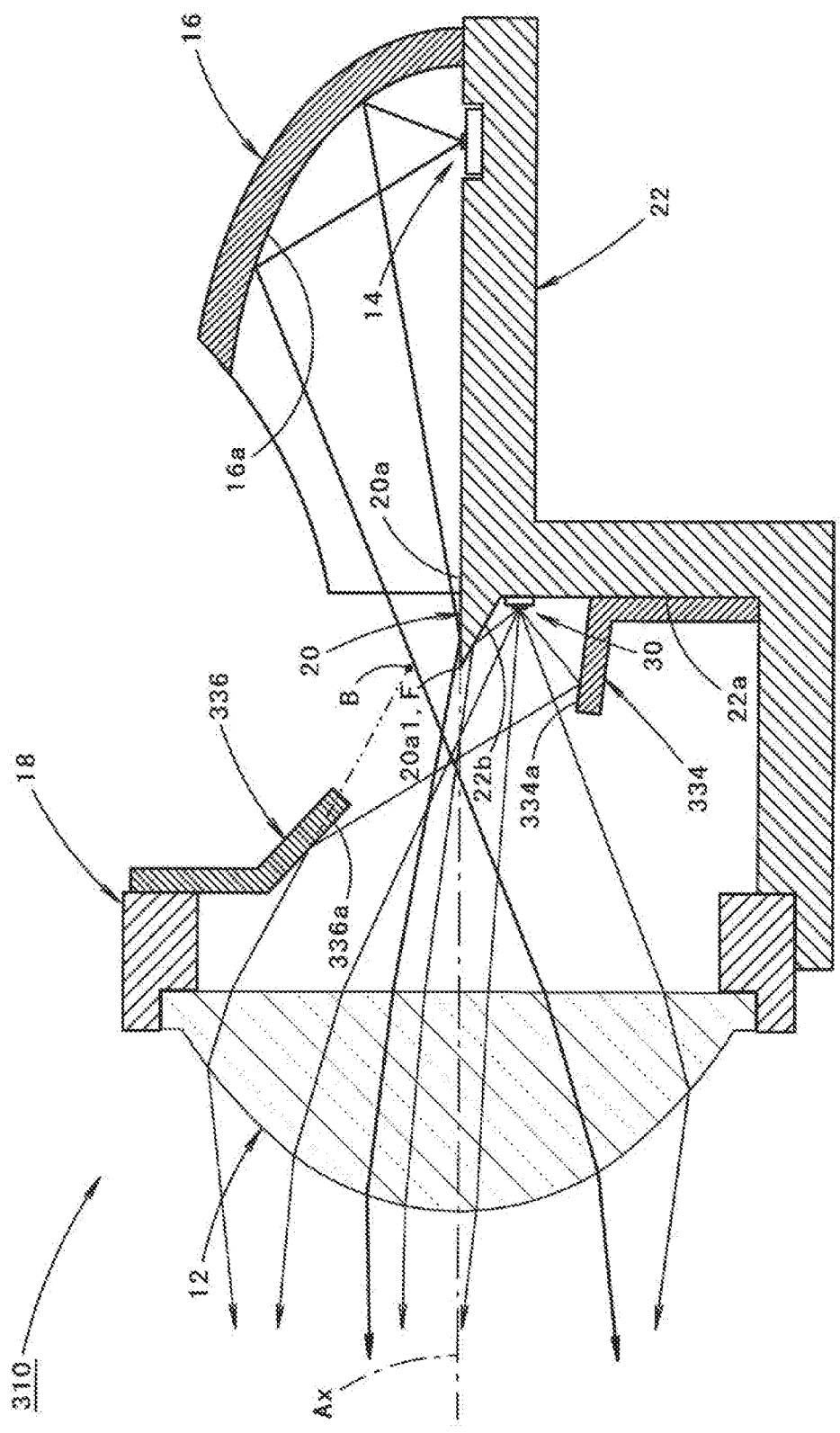
FIG. 8 is a view similar to FIG. 2, which shows a vehicle lamp according to a third modified example of the first embodiment.

FIG. 8 is a view similar to FIG. 2, which shows a vehicle lamp 310 according to this modified example.

As shown in FIG. 8, a basic configuration of the vehicle lamp 310 is similar to that of the vehicle lamp 10 of the above-described embodiment but is different in that second and third reflectors 334, 336 are additionally disposed.

The second reflector 334 is disposed behind a lower area of the projection lens 12 and is supported on the base member 22. The third reflector 336 is disposed behind an upper area of the projection lens 12 and is supported on the lens holder 18.

In this modified example, a part of light emitted from individual light emitting elements 30 is sequentially reflected on the second and third reflectors 334, 336 to be then incident on the projection lens 12.

The second reflector 334 reflects a part of light emitted obliquely downwards and forwards from the individual light emitting elements 30 towards the third reflector 336. In this case, a reflecting surface 334a of the second reflector 334 is formed into a plane surface so as to extend rearwards while being directed slightly downwards.

The third reflector 336 reflects the reflected light from the second reflector 334 towards the projection lens 12. In this case, a reflecting surface 336a of the third reflector 336 is formed into a plane surface so as to extend rearwards while being directed downwards.

In this case, an inclination angle of the reflecting surface 334a is set such that the reflected light reflected on the reflecting surface 334a is incident on the projection lens 12 as light which passes the rear focal plane of the projection lens 12 in a position indicated as a point B in FIG. 8 (a position which is substantially the same as the point A in the second modified example).

An incident angle at which the reflected light from the second reflector 334 is incident on the third reflector 336 is smaller than an incident angle at which the light emitted from the individual light emitting elements 30 is incident on the first reflector 232 in the second modified example. This ensures a greater quantity of light which is emitted slightly downwards from the projection lens 12.

FIG. 9(b) is a view showing a high-beam light distribution pattern PH4 in a perspective manner which is formed on the imaginary vertical screen by light emitted forwards from the vehicle lamp 310.

The high-beam light distribution pattern PH4 is formed as a combined light distribution pattern of a low-beam light distribution pattern PL4 and an additional high-beam light distribution pattern PD.

The low-beam light distribution pattern PL4 has a similar shape to that of the low-beam light distribution pattern PL of the above-described embodiment.

The additional light distribution pattern PD is made up of eleven light distribution patterns Pd.

These light distribution patterns Pd are light distribution patterns which are formed as reverted projected images of light source images of the light emitting elements 30 which are formed on the rear focal plane of the projection lens 12 by light emitted from the individual light emitting elements 30.

In this case, the light distribution patterns Pd are formed in the same shape and arrangement as those of the light distribution patterns Pa of the above-described embodiment. However, the lower end edges extend to a position slightly further downwards than cut-off lines CL1, CL2. This is because the light reflected sequentially by the second and third reflectors 334, 336 is emitted from the projection lens 12 as light directed slightly downwards.

The additional light distribution pattern PD represents a light distribution pattern whose lower end area is brighter than that of the additional light distribution pattern PC of the second modified example. This is because a greater quantity of light which is emitted slightly downwards from the projection lens 12 than that of the second modified example can be ensured.

In this modified example, an intermediate light distribution pattern can be formed such that a part of the light distribution pattern PD is omitted from the high-beam light distribution pattern PH4 by lighting individually the light emitting elements 30.

In this modified example, the operational effects similar to that of the second modified example can be obtained.

By adopting the configuration of this modified example, the additional light distribution pattern PD can be formed as the light distribution pattern whose lower end area is brighter than that of the additional light distribution pattern PC of the second modified example, which is more suitable for forming the high-beam light distribution pattern PH4.

Next, a fourth modified example of the first embodiment will be described.

Figure 10:
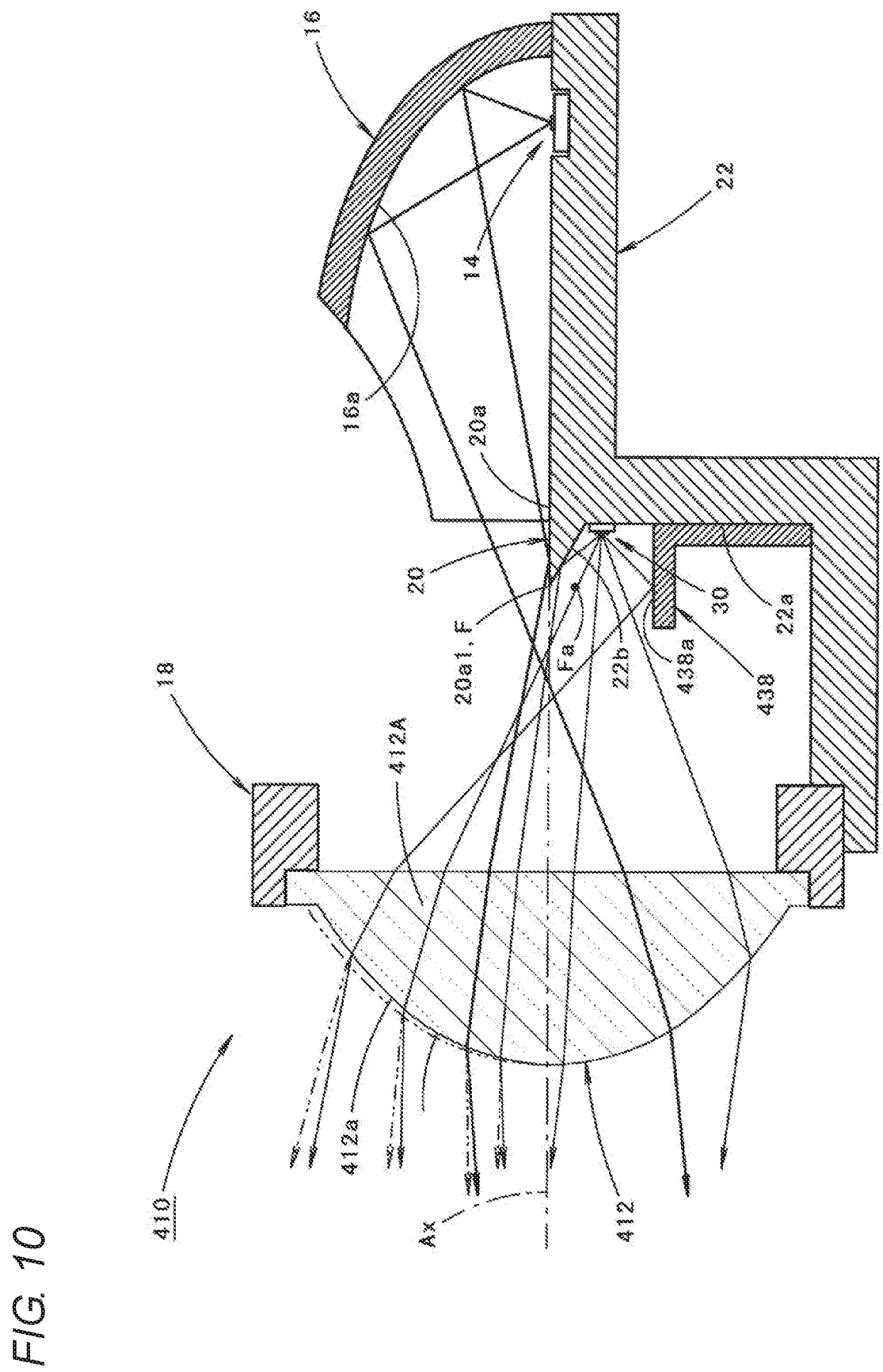
FIG. 10 is a view similar to FIG. 2, which shows a vehicle lamp according to a fourth modified example of the first embodiment.

FIG. 10 is a view similar to FIG. 2, which shows a vehicle lamp 410 according to this modified example.

As shown in FIG. 10, a basic configuration of the vehicle lamp 410 is similar to that of the vehicle lamp 10 of the above-described embodiment but is different in that a projection lens 412 has a different configuration from that of the projection lens 12 of the above-described embodiment and in that a fourth reflector 438 is additionally disposed.

That is, the projection lens 412 of this modified example is formed such that a rear focal point Fa of an upper area 412A of the projection lens 412 which is positioned upper than an optical axis Ax is positioned below a rear focal point F of a general area other than the upper area 412A.

Specifically, the projection lens 412 of this modified example is formed such that a front surface 412a thereof is curved largely further rearwards than the front surface of the projection lens 12 of the above-described embodiment which is indicated by a chain double-dashed line in FIG. 10 in the area above the optical axis Ax.

Therefore, the rear focal point F of the general area is positioned on the optical axis Ax while the rear focal point Fa of the upper area 412A is displaced downwards relative to the rear focal point F.

In this modified example, by adopting the above-described configuration, reflected light from the reflector 16 which is reflected by the upwardly facing surface 20a of the shade 20 to be incident on the upper area 412A of the projection lens 412 and light emitted from individual light emitting elements 30 to be incident on the upper area 412A of the projection lens 412 are emitted forwards from the projection lens 412 as light directed slightly further downwards than the light emitted from the projection lens 12 in the above-described embodiment.

The fourth reflector 438 is disposed below the eleven light emitting elements 30 and is supported on the base member 22. The fourth reflector 438 reflects a part of light emitted obliquely downwards and forwards from the individual light emitting elements 30 towards the upper area 412A of the projection lens 412. In this case, a reflecting surface 438a of the fourth reflector 438 is formed into a plane surface and extends along a horizontal plane.

In this modified example, an additional light distribution pattern which is similar to the additional light distribution pattern PC of the second modified example shown in FIG. 9(a) is formed by lighting the individual light emitting elements 30 at the same time, so that a high-beam light distribution pattern similar to the high-beam light distribution pattern PH3 of the second modified example is formed.

In this modified example, an intermediate light distribution pattern similar to that of the second modified example can be formed by lighting individually the light emitting elements 30.

The same operational effects as that of the second modified example can also be obtained by adopting the configuration of this modified example.

Since light emitted from the individual light emitting elements 30 is incident on the upper area 412A of the projection lens 412 with higher efficiency by adopting the configuration of this modified example, the additional light distribution pattern can be formed as a brighter light distribution pattern.

In the fourth modified example, while the area of the projection lens 412 which is positioned above the optical axis Ax is described as being the upper area 412A, a lower end edge of the upper area 412A does not necessarily have to coincide with the optical axis Ax.

Next, a fifth modified example of the first embodiment will be described.

Figure 11:
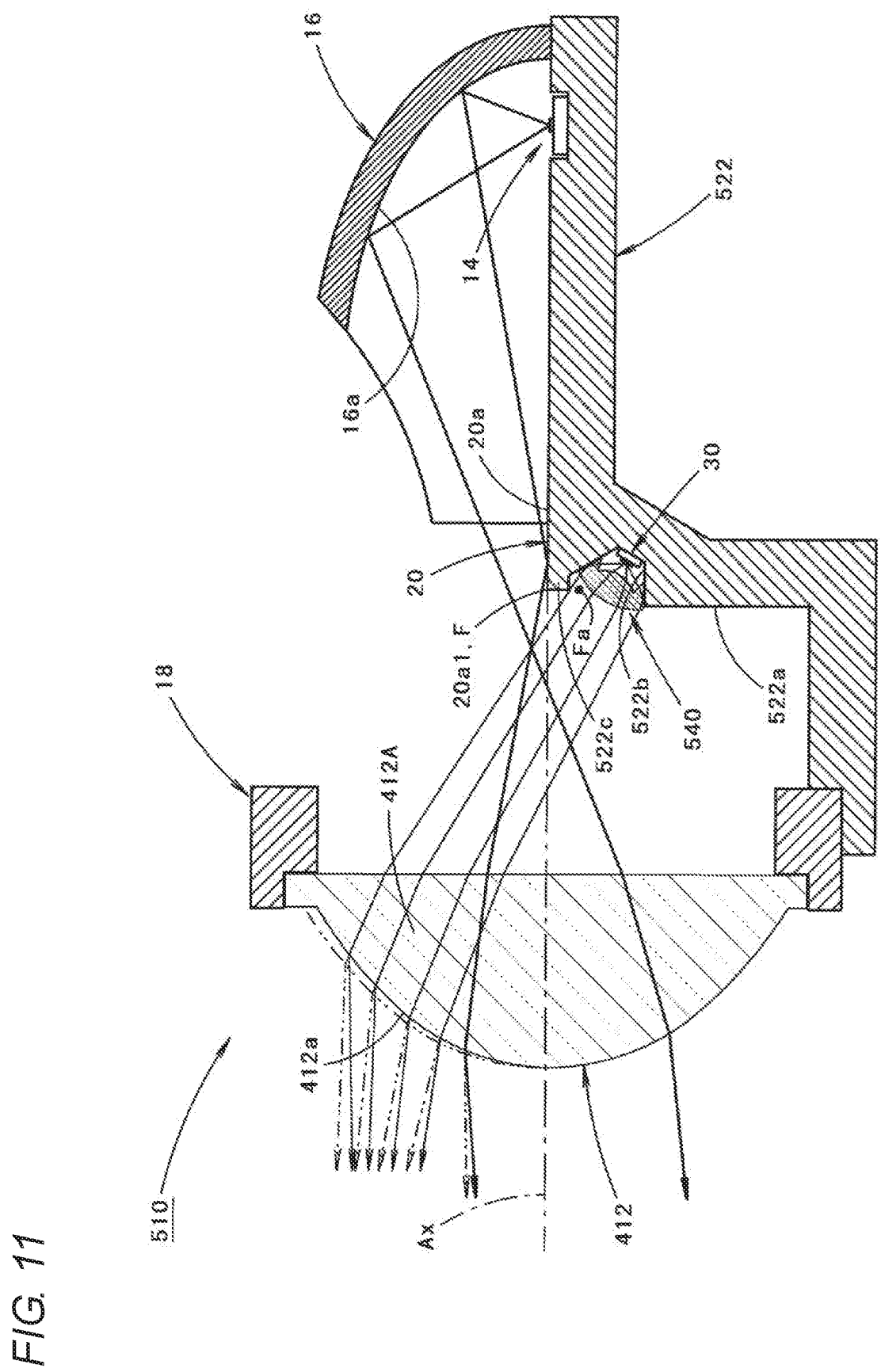
FIG. 11 is a view similar to FIG. 2, which shows a vehicle lamp according to a fifth modified example of the first embodiment.

FIG. 11 is a view similar to FIG. 2, which shows a vehicle lamp 510 according this modified example.

As shown in FIG. 11, a basic configuration of the vehicle lamp 510 is similar to that of the vehicle lamp 410 of the fourth modified example but is different in that individual light emitting elements 30 are disposed differently from the fourth modified example and in that the fourth reflector 438 is not disposed below the eleven light emitting elements 30, but a lens 540 is disposed ahead of the light emitting elements 30. Additionally, in association with the differences described above, the configuration of a base member 522 is different from that of the base member 22 of the fourth modified example.

In this modified example, the light emitting elements 30 are supported on the base member 522 in a position which is spaced obliquely downwards and rearwards away from the front end edge 20a1 of the upwardly facing reflecting surface 20a of the shade 20. In this case, the light emitting elements 30 are disposed further downwards than the position where the light emitting elements 30 are disposed in the fourth modified example with their light emitting surfaces directed obliquely upwards with respect to the direction of the front of the lamp.

The lens 540 is a convex cylindrical lens which extends in the transverse direction. A front surface of the lens 540 is a single convexly curved surface, while a rear surface thereof is a stepped convexly curved surface.

The lens 540 is disposed obliquely upwards and forwards of the light emitting elements 30 with its optical axis directed obliquely upwards and forwards. In this case, the lens 540 performs a direct deflection control on light emitted from the individual light emitting elements 30 at a central portion thereof, while at an upper portion and a lower portion thereof, the lens 540 performs a deflection control on light emitted from the light emitting elements 30 after totally reflecting the light on a rear surface thereof.

The lens 540 deflects and transmits light emitted from the light emitting elements 30 towards the upper area 412A of the projection lens 412 as a flux of light which is close to parallel light within a vertical plane. In this case, the flux of light directed from the lens 540 towards the upper area 412A of the projection lens 412 contains therein the rear focal point Fa of the upper area 412A of the projection lens 412.

In this modified example, a reflecting surface like the reflecting surface 22b of the fourth modified example is not formed at an upper end portion of a front wall surface 522a of the base member 522. Instead, a recess portion 522b is formed to support the individual light emitting elements 30 and the lens 540. A front upper end portion 522c which is positioned above the recess portion 522b which is positioned at an upper end portion of the front wall surface 522a of the base member 522 is formed in a constant thickness so as to extend rearwards from the front end edge 20a1 of the upwardly facing reflecting surface 20a of the shade 20.

In this modified example, an additional light distribution pattern which is similar to the additional light distribution pattern PC of the second modified example shown in FIG. 9(a) is formed by lighting the individual light emitting elements 30 at the same time, so that a high-beam light distribution pattern similar to the high-beam light distribution pattern PH3 of the second modified example is formed.

In this modified example, an intermediate light distribution pattern similar to that of the second modified example can be formed by lighting individually the light emitting elements 30.

In this modified example, the operational effects similar to that of the second modified example can be obtained.

In this modified example, since light emitted from the individual light emitting elements 30 is incident on the upper area 412A of the projection lens 412 with higher efficiency, the additional light distribution pattern can be formed as a brighter light distribution pattern.

Further, since the front upper end portion 522c of the base member 522 can be formed in the constant thickness in this modified example, it is possible to facilitate the manufacture of the base member 522.

Second Embodiment

Next, a second embodiment of the present invention will be described. Similar reference numerals will be given to similar members to those described in the first embodiment and the modified examples thereof, and the description thereof will be omitted for convenience in description.

Figure 12:
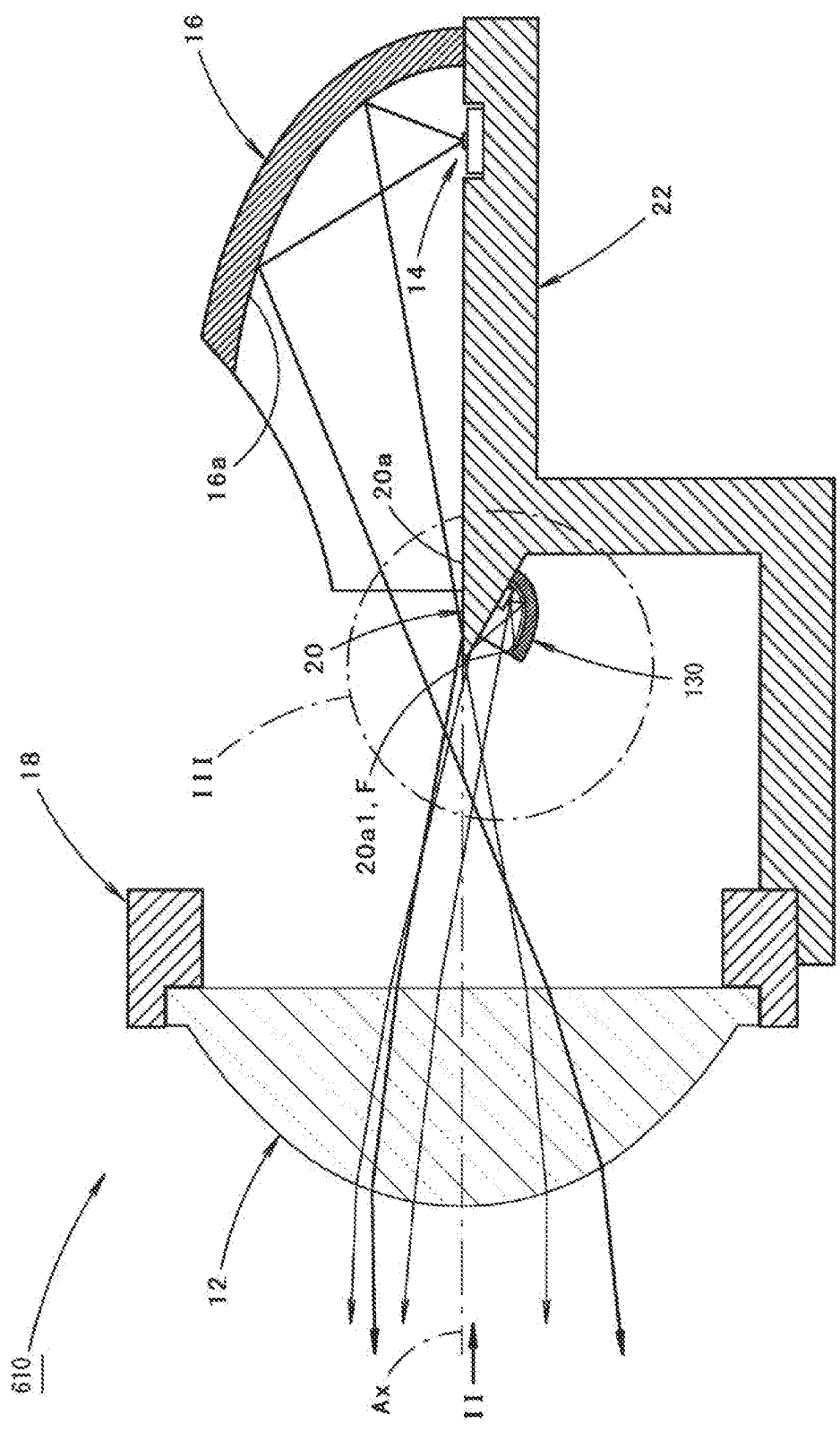
FIG. 12 is a side sectional view showing a vehicle lamp according to a second embodiment of the present invention.
Figure 13:
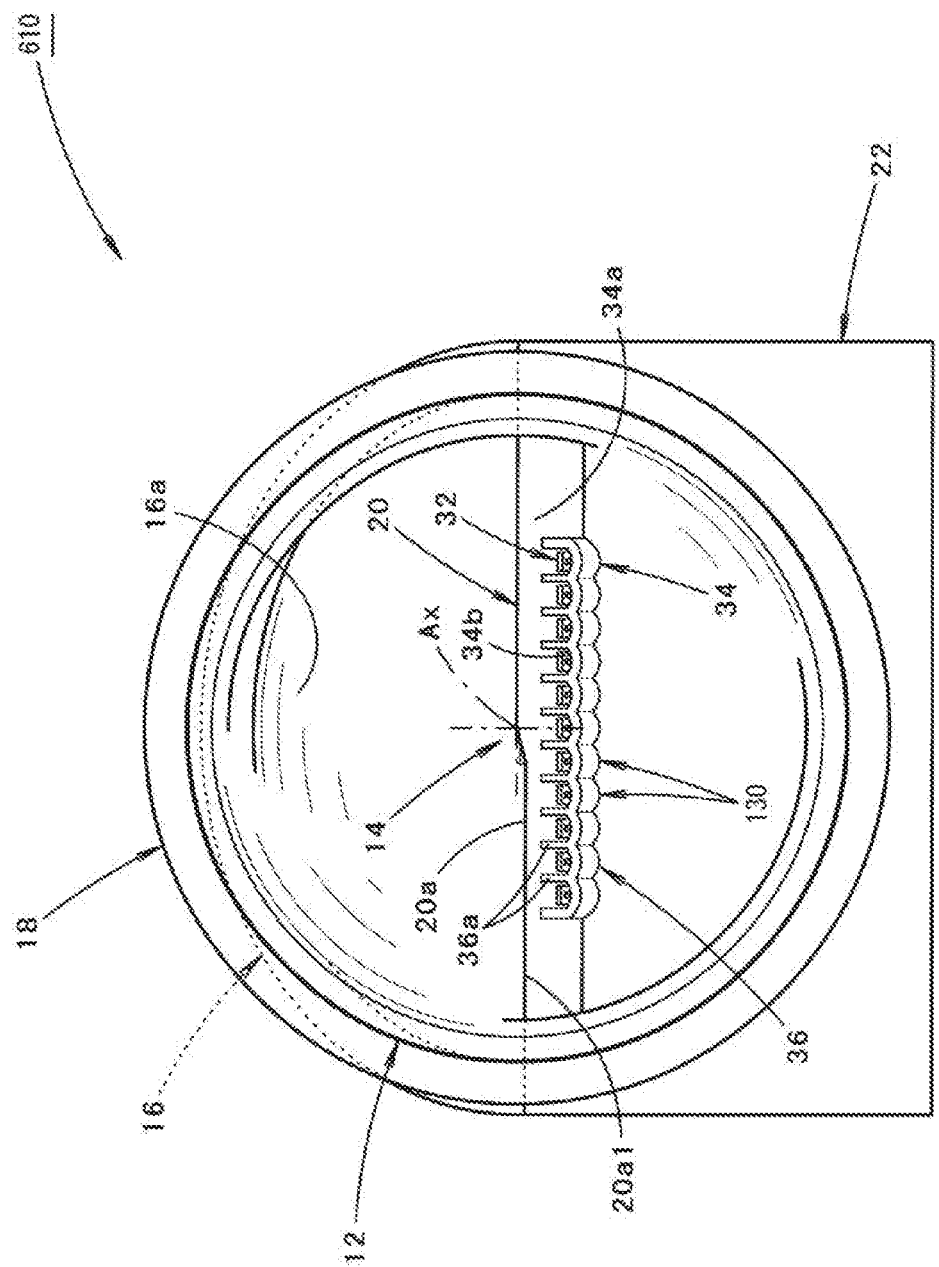
FIG. 13 is a view as seen from a direction indicated by an arrow II in FIG. 12.
Figure 14:
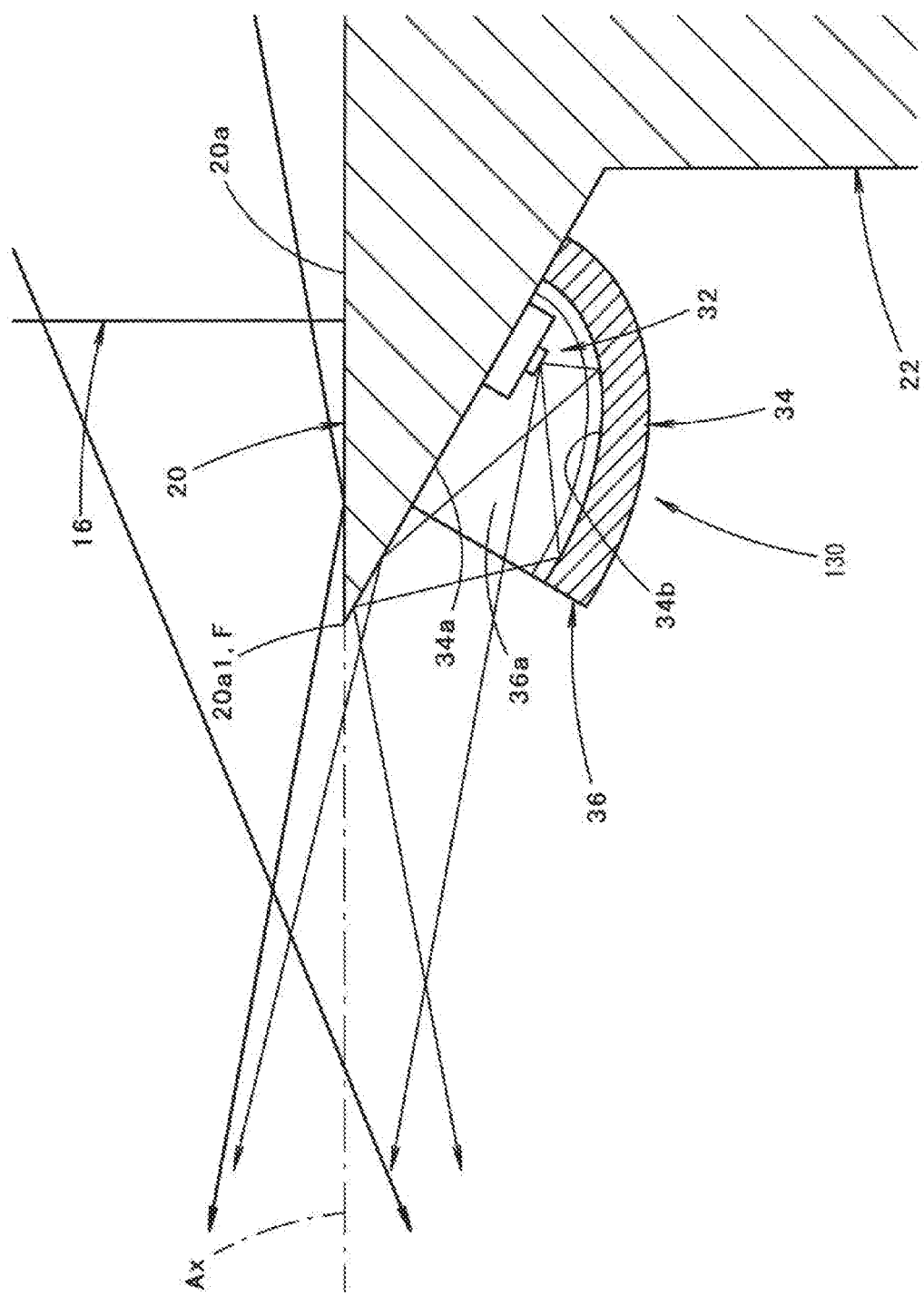
FIG. 14 is a detailed view of a portion denoted as III in FIG. 12.
Figure 15:
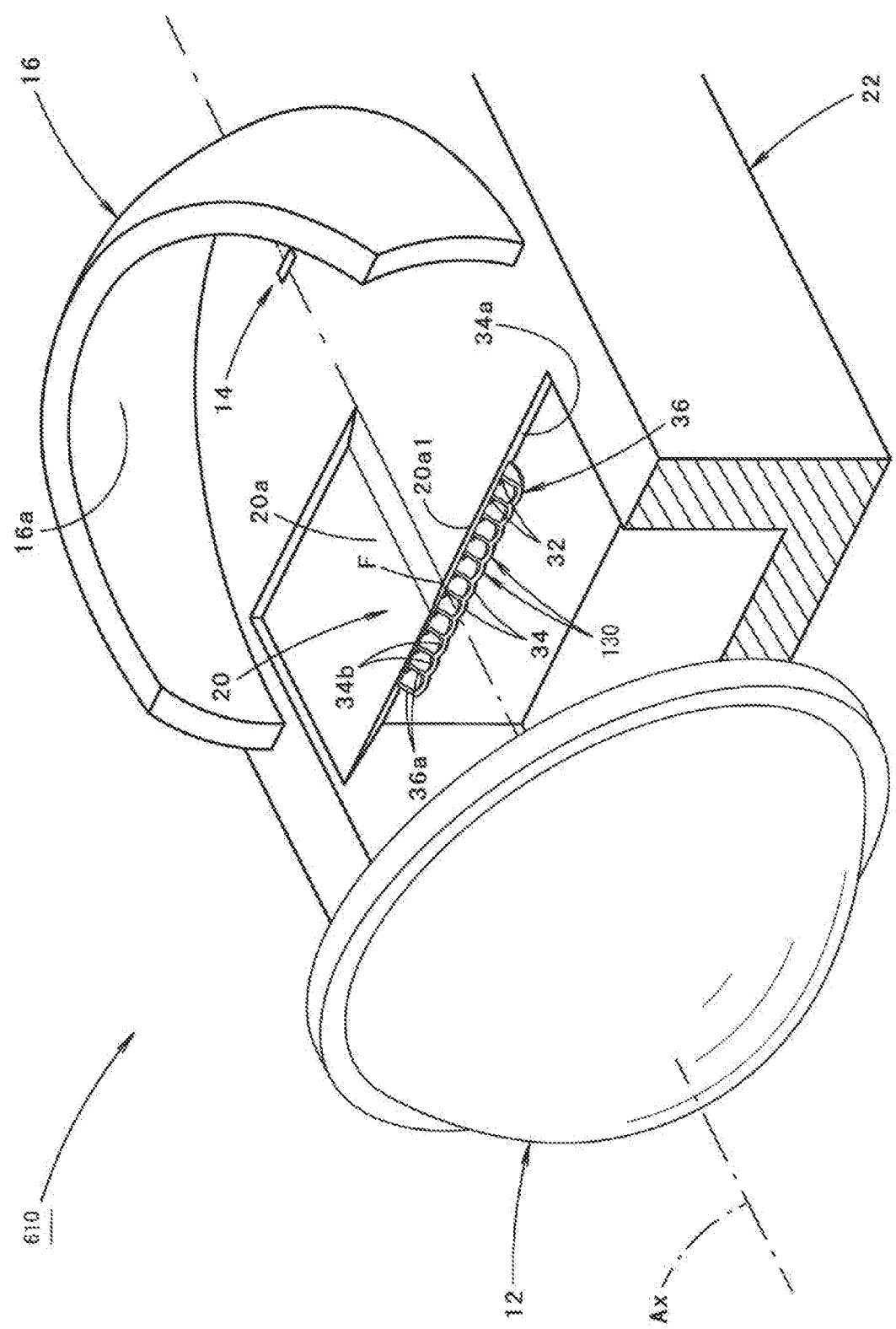
FIG. 15 is a perspective view showing main constituent elements of the vehicle lamp according to the second embodiment.

FIG. 12 is a side sectional view showing a vehicle lamp 610 according to the second embodiment of the present invention. FIG. 13 is a view as seen from a direction indicated by an arrow II in FIG. 12. FIG. 14 is a detailed view of a portion denoted as III in FIG. 12. FIG. 15 is a perspective view showing main constituent elements of the vehicle lamp 610 according to the second embodiment.

As shown in these drawings, a basic configuration of the vehicle lamp 610 of the second embodiment is similar to that of the vehicle lamp 10 according to the first embodiment but is different from the vehicle lamp 10 according to the first embodiment in that a plurality of light emitting units 130 are provided.

The plurality of light emitting units 130 are disposed to be aligned in the transverse direction below the rear focal point F of the projection lens 12 and are configured to be lit individually by an illumination control circuit (not shown). In this embodiment, eleven light emitting units 130 each having a similar configuration are disposed leftwards and rightwards at equal intervals in the transverse direction from a position directly below an optical axis Ax as a center of the arrangement.

As shown in detail in FIG. 14, the light emitting units 130 each include a light emitting element 32 and a reflector 34 which reflects light emitted from the light emitting element 32 towards the projection lens 12.

The reflector 34 includes a first reflecting surface 34a which extends obliquely downwards and rearwards from the front end edge 20a1 of the upwardly facing reflecting surface 20a of the shade 20 (that is, from the vicinity of the rear focal plane of the projection lens 12) and a second reflecting surface 34b which reflects light emitted from the light emitting element 32 towards the first reflecting surface 34a.

A part of the reflector 34 is formed integrally with the base member 22. That is, the first reflecting surface 34a is configured as a part of a front end face of the base member 22, and the second reflecting surface 34b is configured as a part of a cover member 36 which is attached to the base member 22.

The light emitting element 32 is a white light emitting diode and is supported on the first reflecting surface 34a in a position which is spaced away obliquely downwards and rearwards from the front end edge 20a1 of the upwardly facing reflecting surface 20a. That is, this light emitting element 32 is disposed such that its light emitting surface is directed obliquely downwards and forwards in a direction which is at right angles to the first reflecting surface 34a.

The second reflecting surface 34b is disposed to cover the light emitting element 32 from therebelow. This second reflecting surface 34b is a substantially ellipsoidal curved surface and reflects light from the light emitting element 32 towards an area of the first reflecting surface 34a which is near a front end edge thereof.

The cover member 36 is formed transversely long so as to extend across the eleven light emitting units 130. The cover member 36 includes partition portions 36a which are formed in both left and right end positions and boundary positions between the second reflecting surfaces 34b so as to extend in a vertical direction which is parallel to the optical axis Ax.

In this case, the side surface of each partition portion 36a is configured as a reflecting surface.

The partition portions 36a are formed to extend to the first reflecting surfaces 34a to thereby divide the second reflecting surfaces 34b individually for each light emitting unit 130. In this case, front end positions of the second reflecting surfaces 34b and the partition portions 36a are positioned slightly further rearwards than the rear focal plane of the projection lens 12.

In each light emitting unit 130, a part of light emitted from the light emitting element 32 is reflected on the second reflecting surface 34b and is thereafter reflected again on the first reflecting surface 34a to be incident on the projection lens 12, another part of the emitted light is reflected directly on the first reflecting surface 34a to be incident on the projection lens 12, and a further part of the emitted light is incident on the projection lens 12 as direct light. At this time, in any one of the cases, the part of the emitted light is reflected on the left and right side surfaces of the partition portion 36a and is then incident on the projection lens 12.

That is, light directed from each light emitting unit 130 towards the projection lens 12 is caused to converge into an open range surrounded by the first and second reflecting surfaces 34a, 34b and the pair of left and right partition portions 36a at a front end edge of the cover member 36 and then passes the rear focal plane of the projection lens 12. Consequently, in the light emitting units 130 which are disposed adjacent to each other, ranges of fluxes of light passing the rear focal plane of the projection lens 12 are slightly overlapped with each other.

Figure 16:
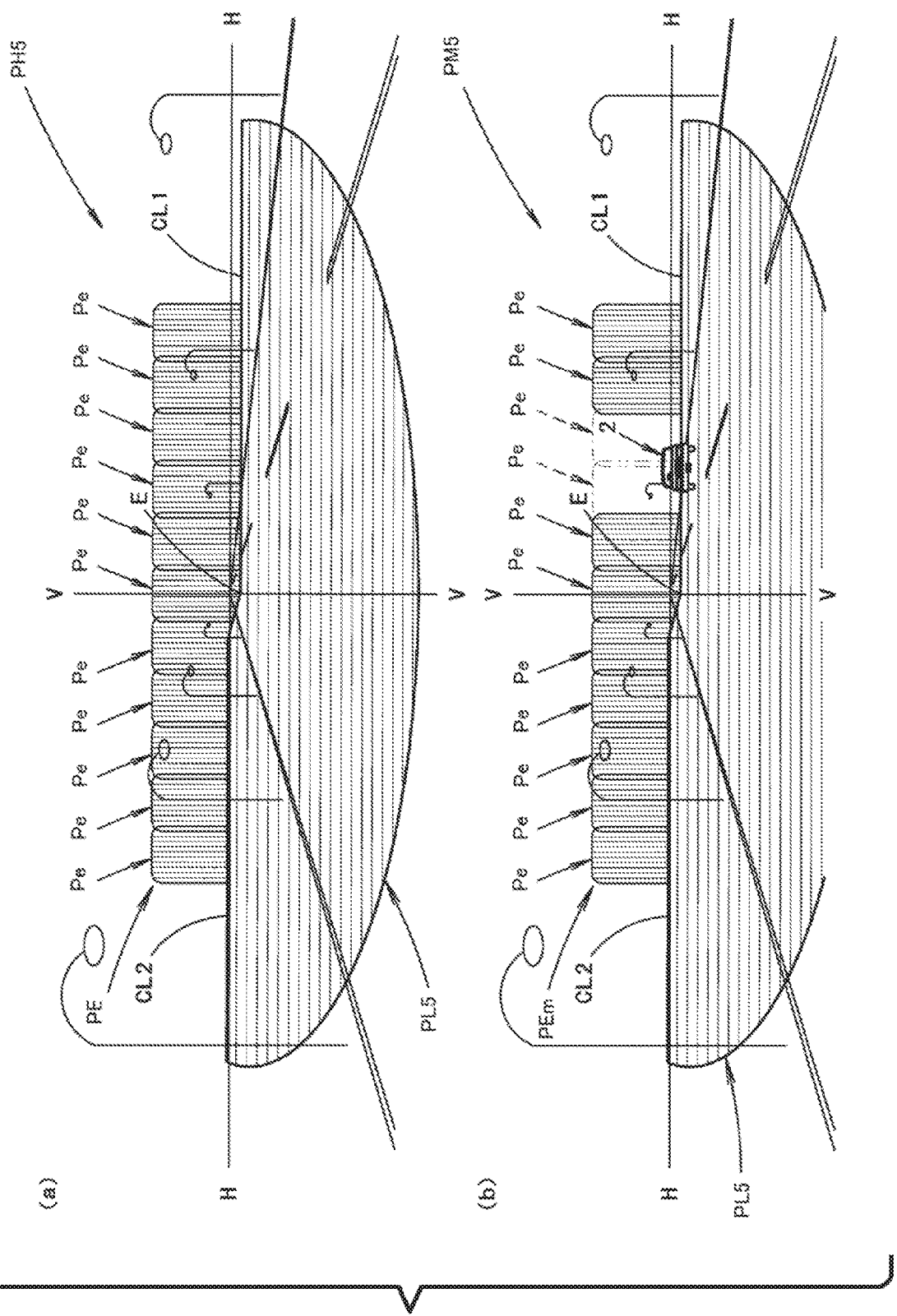
FIG. 16 is a diagram showing light distribution patterns in a perspective manner which are formed on an imaginary vertical screen disposed in a position at 25 meters ahead of the vehicle lamp according to the second embodiment by light emitted forwards from the lamp.

FIG. 16 is a diagram showing light distribution patterns in a perspective manner which are formed on an imaginary vertical screen disposed in a position 25 meters ahead of the vehicle by light emitted forwards from the vehicle lamp 610. FIG. 16(a) is a view showing a high-beam light distribution pattern PH9, and FIG. 16(b) is a view showing an intermediate light distribution pattern PM5.

The high-beam light distribution pattern PH9 shown in FIG. 16(a) is formed as a combined light distribution pattern of a low-beam light distribution pattern PL5 and an additional high-beam light distribution pattern PE.

In the high-beam light distribution pattern PH9, the additional light distribution pattern PE is formed additionally as a transversely long light distribution pattern which expands upwards from cut-off lines CL1, CL2, so that a driving path ahead of the vehicle is illuminated widely.

The additional light distribution pattern PE is formed as a combined light distribution pattern of eleven light distribution pattern Pe.

The light distribution patterns Pe are light distribution patterns which are formed as reverted projected images of light source images of the individual light emitting elements 32 which are formed on the rear focal plane of the projection lens 12 by light emitted individually from the light emitting units 130.

In this case, each light distribution pattern Pe has a substantially rectangular shape which is slightly longer in a vertical direction. This corresponds to the configuration in which a flux of light emitted from each light emitting unit 130 is converged into the open range surrounded by the first and second reflecting surfaces 34a. 34b and the pair of left and right partition portions 36a.

Additionally, the light distribution patterns Pe are formed such that the adjacent light distribution patterns Pe are slightly overlapped with each other. This is because the ranges of fluxes of light emitted from the adjacent light emitting units 130 and passing the rear focal plane of the projection lens 12 are slightly overlapped with each other.

Further, lower end edges of the light distribution patterns Pe coincide with the positions of the cut-offlines CL1, CL2. This is because the first reflecting surface 34a is formed to extend obliquely downwards and rearwards from the front end edge 20a1 of the upwardly facing reflecting surface 20a of the shade 20.

In light which forms each light distribution pattern Pe, light emitted from the light emitting element 32 and reflected on the second reflecting surface 34b is reflected on an area of the first reflecting surface 34a which is near a front end edge thereof, and therefore, each light distribution pattern Pe is formed with a luminous intensity distribution in which the luminous intensity is high at the lower end area thereof. Consequently, the additional light distribution pattern PE which is formed as the combined light distribution pattern of those light distribution patterns Pe can be formed as the light distribution pattern in which the areas along the cut-off lines CL1, CL2 are brightly illuminated, which can be suitable for formation of the high-beam light distribution pattern PH9.

The intermediate light distribution pattern PM5 shown in FIG. 16(b) is a light distribution pattern having an additional light distribution pattern PEm which is partially not illuminated, in place of the additional light distribution pattern PE which forms the high-beam light distribution pattern PH9.

Specifically, the additional light distribution pattern PEm represents a light distribution pattern where the third and fourth light distribution pattern Pe from the right are omitted in the eleven light distribution patterns Pe. This light distribution pattern PEm is formed by turning off the third and fourth light emitting units 130 from the left in the eleven light emitting units 130.

By forming the intermediate light distribution pattern PM5, the driving path ahead of the vehicle is attempted to be illuminated as widely as possible to such an extent that light emitted from the vehicle lamp 610 is not directed to an oncoming vehicle 2 to dazzle the driver of the oncoming vehicle 2.

The shape of the additional light distribution pattern PEm is controlled to change as the position of the oncoming vehicle 2 changes by sequentially changing the light emitting units 130 to be turned off, so that the driving path ahead of the vehicle is kept illuminated as widely as possible to such an extent that the driver of the oncoming vehicle 2 is not dazzled.

The presence of the oncoming vehicle 2 is detected by an onboard camera (not shown). In addition, if a preceding vehicle presents on the driving path ahead of the vehicle or a pedestrian walks on the shoulder of the driving path, the onboard camera detects them, so that the preceding vehicle or the pedestrian is prevented from being dazzled by turning off a part of the light distribution patterns Pe.

Next, the operational effects of the second embodiment will be described.

The vehicle lamp 610 according to the second embodiment is configured as the projector-type lamp which selectively performs low beam illumination and high beam illumination, wherein light emitted from the eleven light emitting units 130 is incident on the projection lens 12 to form the additional high beam light distribution pattern PE. In this case, the eleven light emitting units 130 are disposed to be aligned in the transverse direction below the rear focal point F of the projection lens 12 and are configured to be lit individually, so that the following operational effect can be obtained.

That is, the high-beam light distribution pattern PH9 can be formed by forming the additional light distribution pattern PE while lighting the eleven light emitting units 130 at the same time. In addition, by selectively lighting a part of the eleven light emitting units 130, the additional light distribution pattern PEm can be formed where a part of the additional light distribution pattern PE is omitted, so that the intermediate light distribution pattern PM5 can be formed which is between the low-beam light distribution pattern PL5 and the high-beam light distribution pattern PH9.

Moreover, this can be realized by the projector-type optical system using the single projection lens 12.

Accordingly, in this embodiment, in the vehicle lamp 610 which selectively performs low beam illumination and high beam illumination, the additional high-beam light distribution patterns PE, PEm can be formed by the plurality of types of light distribution patterns with the compact configuration.

In the embodiment, since each light emitting unit 130 includes the light emitting element 32 and the reflector 34 which reflects light emitted from the light emitting element 32 towards the projection lens 12, the configuration of each light emitting unit 130 can be simple.

Moreover, since the reflector 34 includes the first reflecting surface 34a which extends obliquely downwards and rearwards from the vicinity of the rear focal plane of the projection lens 12 and the second reflecting surface 34b which reflects light emitted from the light emitting element 32 towards the first reflecting surface 34a, light emitted from the light emitting element 32 is incident on the projection lens 12 with higher efficiency.

In this case, since the first reflecting surface 34a is formed such that the front end edge thereof coincides with the front end edge 20al of the upwardly facing reflecting surface 20a of the shade 20, the low-beam light distribution pattern PL5 and the additional light distribution pattern PE are not separated at the portions where the cut-off lines CL1, CL2 are formed.

Further, in this embodiment, the light emitting units 130 are divided by the left and right partition portions 36a, so that the ranges of fluxes of light emitted from the adjacent light emitting units 130 and passing the rear focal plane of the projection lens 12 are overlapped with each other. Therefore, the eleven light distribution patterns Pe which form the additional light distribution pattern PE can also be formed to be slightly overlapped with each other. Accordingly, the additional light distribution pattern PEm where a part of the light distribution patterns Pe is not illuminated by turning off a part of the light emitting units 130 can be formed as the light distribution pattern in which left and right boundary lines of the unilluminated light distribution patterns become relatively clear.

In the above-described embodiment, while the vehicle lamp 610 including the eleven light emitting units 130, the vehicle lamp 610 may include any other number of light emitting units 130.

Next, modified examples of the second embodiment will be described.

Firstly, a first modified example of the second embodiment will be described.

Figure 17:
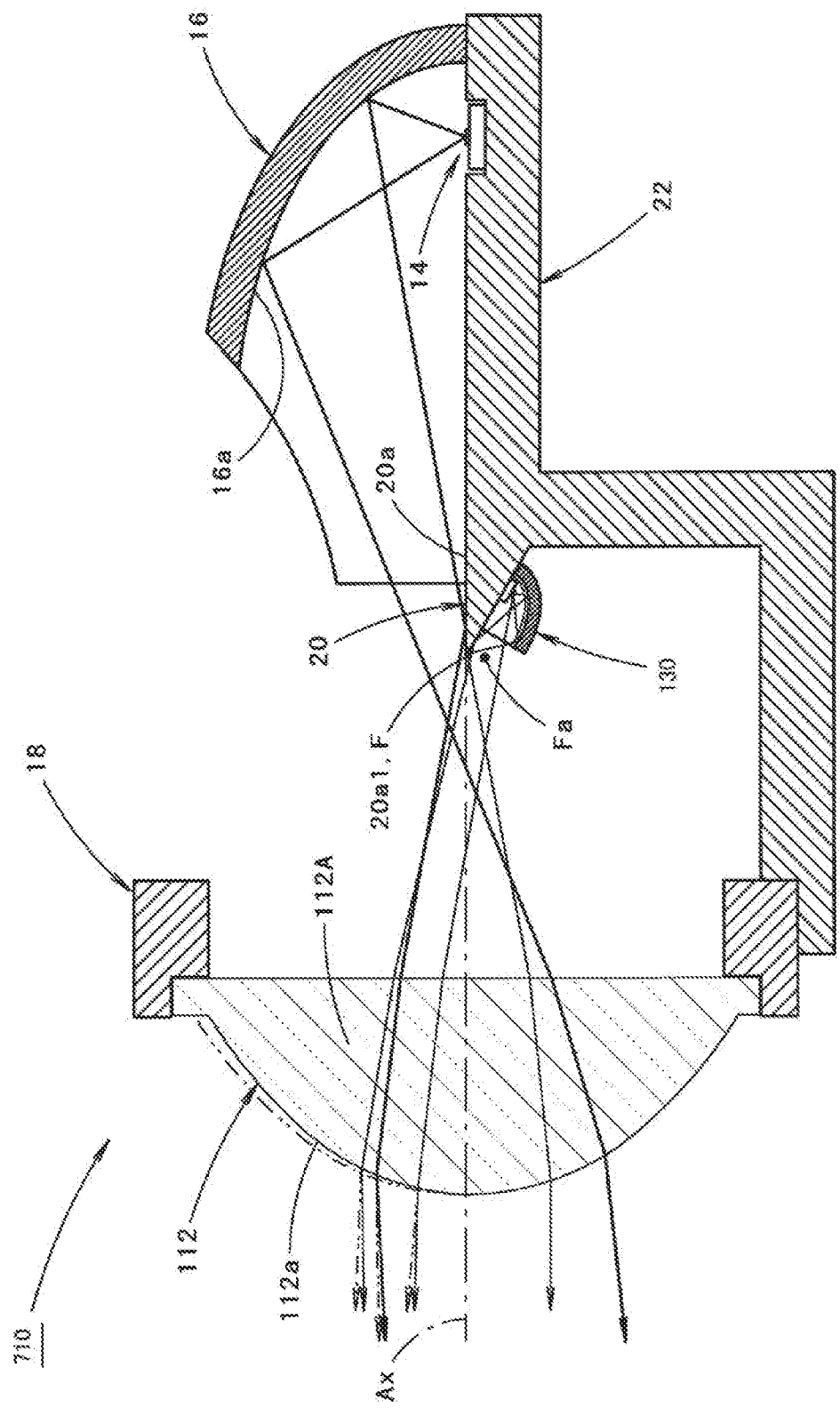
FIG. 17 is a view similar to FIG. 12, which shows a vehicle lamp according to a first modified example of the second embodiment.

FIG. 17 is a view similar to FIG. 12, which shows a vehicle lamp 710 according to this modified example.

As shown in FIG. 17, a basic configuration of the vehicle lamp 710 is similar to that of the vehicle lamp 610 of the above-described second embodiment but is different in that a projection lens 112 has a different configuration from that of the projection lens 412 of the second embodiment.

That is, the projection lens 112 of this modified example is formed such that a rear focal point Fa of an upper area 112A of the projection lens 112 is positioned below a rear focal point F of a general area other than the upper area 112A.

Specifically, the projection lens 112 of this modified example is formed such that a front surface 112a thereof is curved greatly further rearwards than the front surface of the projection lens 12 of the above-described embodiment which is indicated by a chain double-dashed line in FIG. 17 in the area above an optical axis Ax. Because of this, the rear focal point F of the general area is positioned on the optical axis Ax while the rear focal point Fa of the upper area 112A is displaced downwards relative to the rear focal point F.

In this modified example, by adopting the above-described configuration, reflected light from the reflector 16 which is reflected by the upwardly facing reflecting surface 20a of the shade 20 to be incident on the upper area 112A of the projection lens 112 and light emitted from individual light emitting units 130 to be incident on the upper area 112A of the projection lens 112 are emitted forwards from the projection lens 112 as light directed slightly further downwards than the light emitted from the projection lens 12 in the above-described embodiment.

Figure 18:
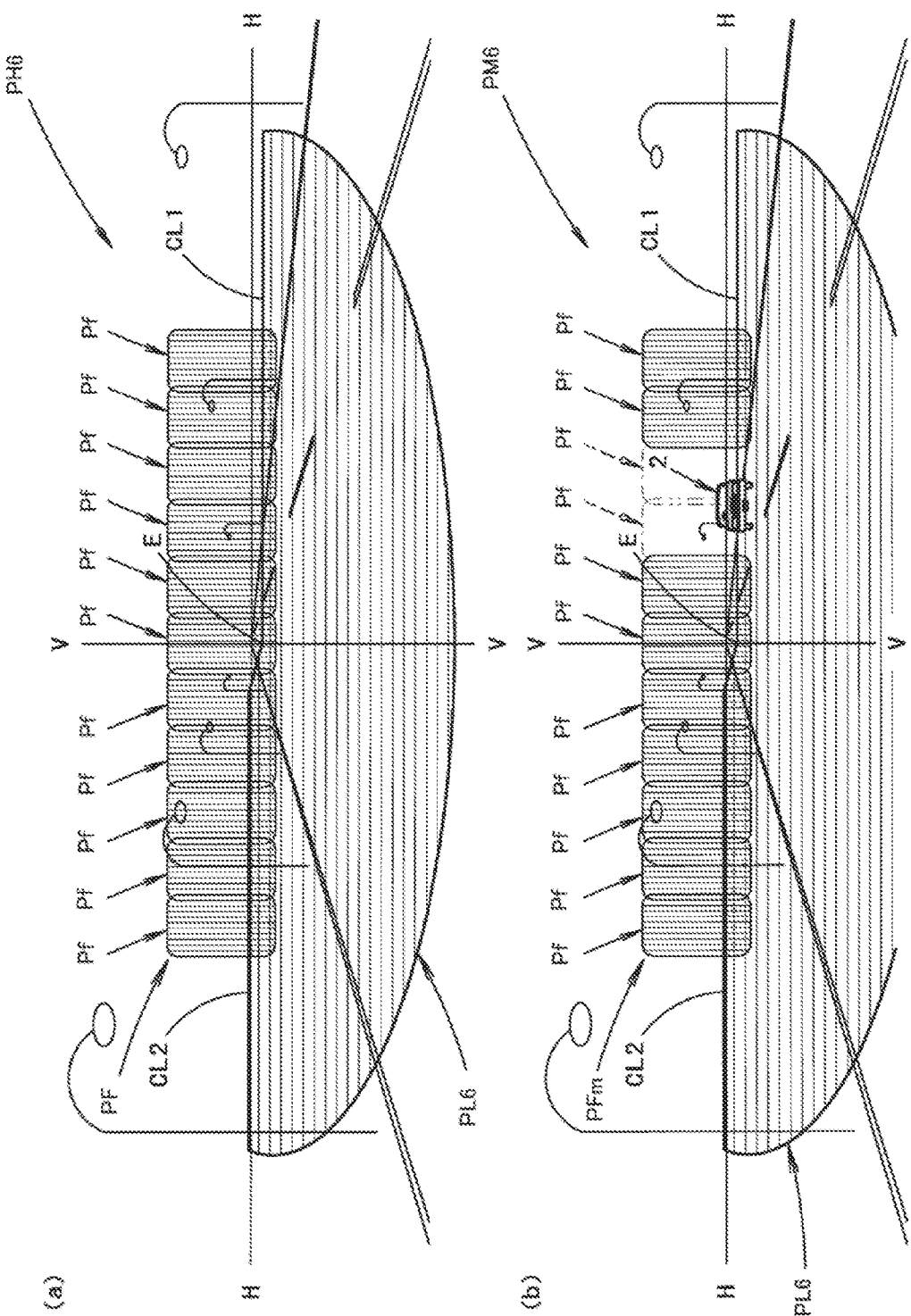
FIG. 18 is a view similar to FIG. 16, which shows operations of the first modified example.

FIG. 18 is a view showing light distribution patterns in a perspective manner which are formed on the imaginary vertical screen by light emitted forwards from the vehicle lamp 710. FIG. 18(a) shows a high-beam light distribution pattern PH6, and FIG. 18(b) shows an intermediate light distribution pattern PM6.

The high-beam light distribution pattern PH6 shown in FIG. 18(a) is formed as a combined light distribution pattern of a low-beam light distribution pattern PL6 and an additional high-beam light distribution pattern PJ.

The additional light distribution pattern PJ is formed as a combined light distribution patter of eleven light distribution patterns Pj.

The light distribution patterns Pj are light distribution patterns which are formed as reverted projected images of light source images of light emitting elements 32 which are formed on the rear focal plane of the projection lens 12 by light emitted from the individual light emitting units 130.

In this case, these light distribution patterns Pj are formed in the same shape and arrangement as those of the light distribution patterns Pe of the above-described embodiment. However, the lower end edges extend to a position slightly further downwards than cut-off lines CL1, CL2. This is because the rear focal point Fa of the upper area 112A of the projection lens 112 is displaced downwards relative to the rear focal point F of the general area.

The low-beam light distribution pattern PL6 has a luminous intensity distribution which is slightly different from that of the low-beam light distribution pattern PL5 of the above-described embodiment. However, an overall shape of the low-beam light distribution pattern PL6 is similar to that of the low-beam light distribution pattern PL5.

The intermediate light distribution pattern PM6 shown in FIG. 18(b) is a light distribution pattern having an additional light distribution pattern PJm which is partially not illuminated, in place of the additional light distribution pattern PJ which forms the high-beam light distribution pattern PH6.

In this modified example, the additional high-beam light distribution patterns PJ, PJm can be formed by the plurality of types of light illuminating patterns with the compact configuration.

In addition, by adopting the configuration of this modified example, in the high-beam light distribution pattern PH6, the low-beam light distribution pattern PL6 is overlapped partially with the additional light distribution pattern PJ at the portions where the cut-off lines CL1, CL2 are formed, so that the continuity of the low-beam light distribution pattern PL6 with the additional light distribution pattern PJ can be enhanced.

This will be true with the intermediate light distribution pattern PM6, and the continuity of the low-beam light distribution pattern PL6 with the additional light distribution pattern PJm can be enhanced.

In this first modified example, while the area of the projection lens 112 which is positioned above the optical axis Ax is described as being the upper area 112A, the lower end edge of the upper area 112A does not necessarily have to coincide in position with the optical axis Ax.

Next, a second modified example of the second embodiment will be described.

Figure 19:
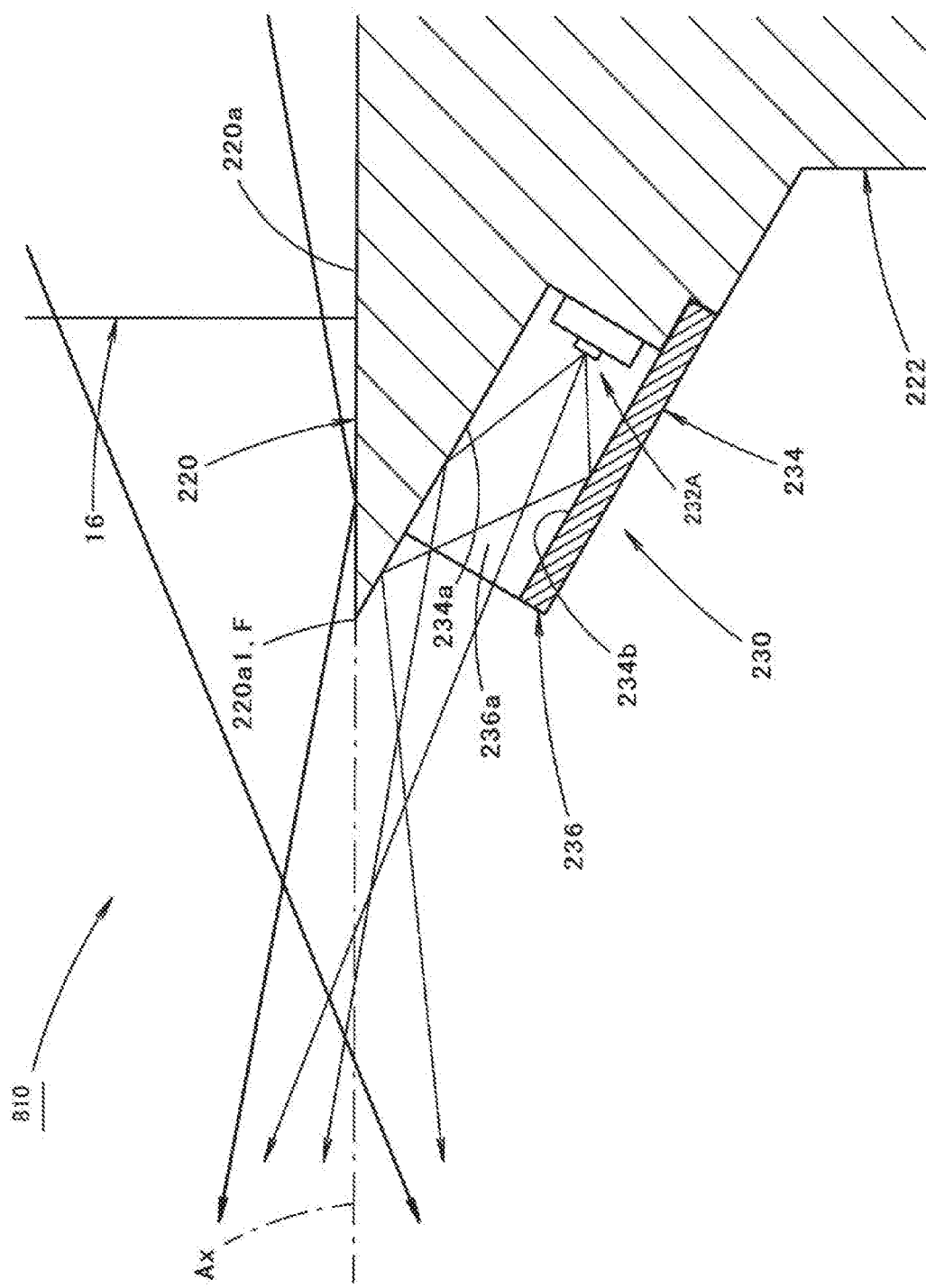
FIG. 19 is a view similar to FIG. 14, which shows a main part of the vehicle lamp according to a second modified example of the second embodiment.

FIG. 19 is a view similar to FIG. 14, which shows a main part of a vehicle lamp 810 according to this modified example.

As shown in FIG. 19, a basic configuration of this vehicle lamp 810 is similar to that of the vehicle lamp 610 of the above-described embodiment but is different in that the configuration of each light emitting unit 230 is different from that in the above-described embodiment, and the configurations of a shade 220 and a base member 222 are partially different as well.

That is, in this modified example, the light emitting units 230 each includes a light emitting element 232A and a reflector 234 which reflects light emitted from the light emitting element 232A towards the projection lens 12.

The reflector 234 includes a first reflecting surface 234a which extends obliquely downwards and rearwards from a front end edge 220a1 of an upwardly facing reflecting surface 220a of the shade 220 (that is, from the vicinity of the rear focal plane of the projection lens 12) and a second reflecting surface 234b which reflects light emitted from the light emitting element 232A towards the first reflecting surface 234a.

The first reflecting surface 234a is configured as a part of the base member 222. The second reflecting surface 234b is configured as a part of a cover member 236 which is attached to the base member 222.

The light emitting element 232A is a white light emitting diode and is supported on a plane which is at right angles to the first reflecting surface 234a in a position which is spaced away obliquely downwards and rearwards from the front end edge 220a1 of the upwardly facing reflecting surface 220a. That is, this light emitting element 232A is disposed such that its light emitting surface is directed obliquely upwards and forwards in a direction which is parallel to the first reflecting surface 234a.

The second reflecting surface 234b is disposed to cover the light emitting element 232A from therebelow. This second reflecting surface 234b is formed into a plane and reflects light from the light emitting element 232A towards the first reflecting surface 234a.

The cover member 236 is formed transversely long so as to extend across the eleven light emitting units 230. The cover member 236 includes partition portions 236a which are formed in both left and right end positions and boundary positions between the second reflecting surfaces 234b so as to extend in a vertical direction which is parallel to the optical axis Ax. In this case, the side surface of each partition portion 236a is configured as reflecting surfaces.

The partition portions 236a are formed to extend to first reflecting surfaces 234a to thereby divide the second reflecting surfaces 234b individually for each light emitting unit 230. In this case, front end positions of the second reflecting surfaces 234b and the partition portions 236a are positioned slightly further rearwards than the rear focal plane of the projection lens 12.

In each light emitting unit 230, a part of light emitted from the light emitting element 232A is reflected on the second reflecting surface 234b and is thereafter reflected again on the first reflecting surface 234a to be incident on the projection lens 12, another part of the emitted light is reflected directly on the first reflecting surface 234a to be incident on the projection lens 12, and a further part of the emitted light is incident on the projection lens 12 as direct light. At this time, in any one of the cases, the part of the emitted light is reflected on the left and right side surfaces of the partition portion 236a and is then incident on the projection lens 12.

That is, light directed from each light emitting unit 230 towards the projection lens 12 is caused to converge into an open range surrounded by the first and second reflecting surfaces 234a, 234b and the pair of left and right partition portions 236a at a front end edge of the cover member 230 and then passes the rear focal plane of the projection lens 12. Consequently, in the light emitting units 230 which are disposed adjacent to each other, ranges of fluxes of light passing the rear focal plane of the projection lens 12 are slightly overlapped with each other.

Figure 20:
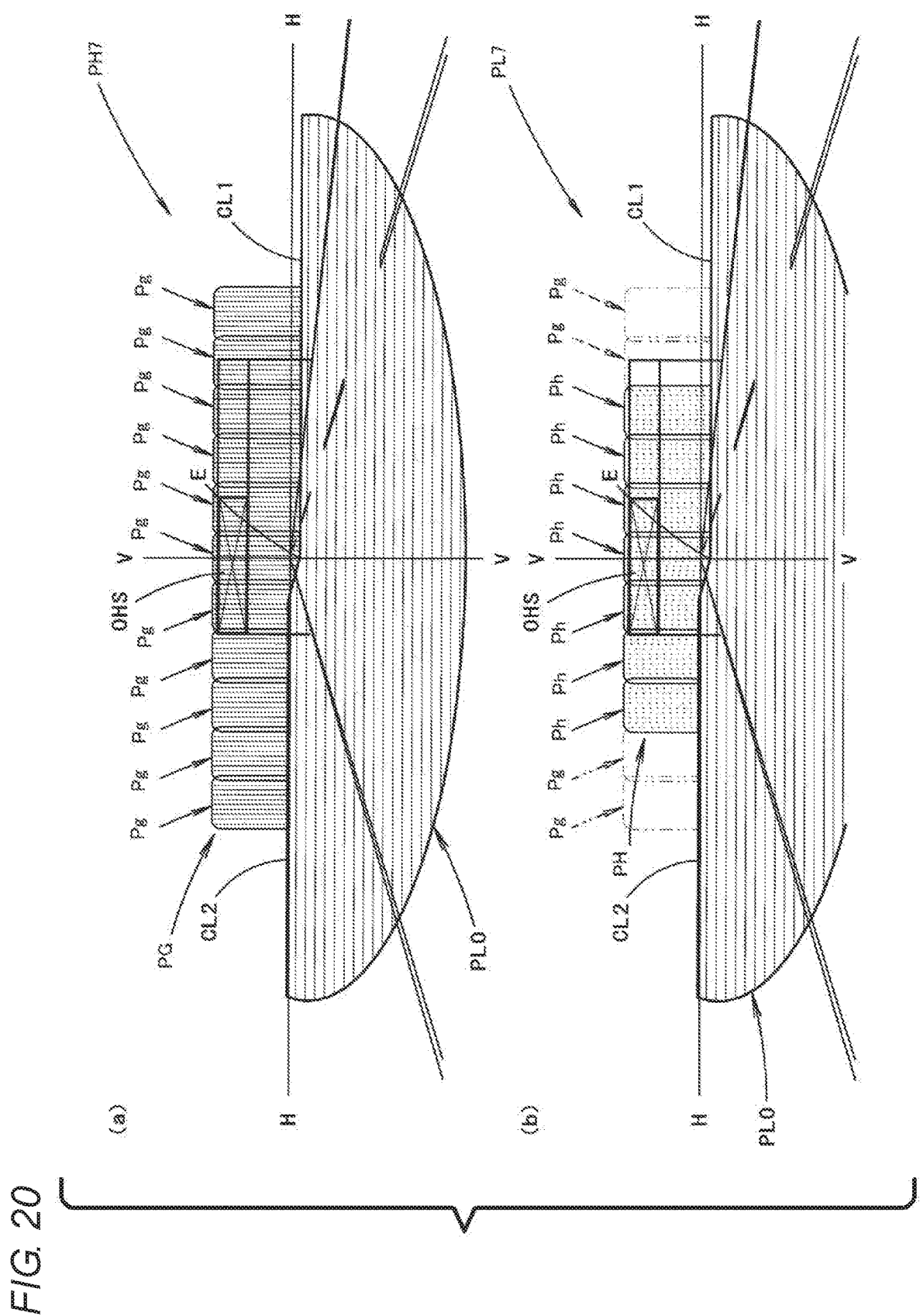
FIG. 20 is a view similar to FIG. 16, which shows operations of the second modified example.

FIG. 20 is a diagram showing light distribution patterns in a perspective manner which are formed on the imaginary vertical screen by light emitted forwards from the vehicle lamp 810. FIG. 20(a) is a view showing a high-beam light distribution pattern PH7, and FIG. 20(b) is a view showing a low-beam light distribution pattern PL7.

The high-beam light distribution pattern PH7 shown in FIG. 20(a) is formed as a combined light distribution pattern of a low-beam basic light distribution pattern PL0 and an additional high-beam light distribution pattern PG.

The low-beam basic light distribution pattern PL0 is similar to the low-beam light distribution pattern PL5 of the above-described embodiment.

The additional light distribution pattern PG is formed as a combined light distribution pattern of eleven light distribution patterns Pg.

The light distribution patterns Pg are light distribution patterns which are formed as reverted projected images of light source images of the individual light emitting elements 232A which are formed on the rear focal plane of the projection lens 12 by light emitted individually from the light emitting units 230.

In this case, these light distribution patterns Pg are formed in the same shape and arrangement as those of the light distribution patterns Pe of the above-described embodiment but have a different luminous intensity distribution.

That is, these light distribution patterns Pg are formed with a luminous intensity distribution in which a central portion is the brightest and the luminous intensity is gradually reduced towards a circumferential edge portion. This is because the second reflecting surface 234b is formed into the plane.

The low-beam light distribution pattern PL7 shown in FIG. 20(b) represents a light distribution pattern in which an OHS illuminating light distribution pattern PH for illuminating an overhead sign OHS which is set on the driving path ahead of the vehicle is added to the basic light distribution pattern PL0.

The OHS illuminating light distribution pattern PH is formed as a combined light distribution patter of seven light emitting units 230 out of the eleven light emitting units 230. The seven light emitting units 230 which are obtained by turning off four light emitting units 230 at each end of the array of the eleven light emitting units 230, and the luminous intensity of the seven light emitting units 230 are reduced.

In this case, since each light distribution pattern Pg has the luminous intensity distribution in which the central portion is the brightest and the luminous intensity is gradually reduced towards the circumferential edge portion, in each of the light distribution patterns Ph which are less bright as a whole by the reduction of the luminous intensity, an outer circumferential edge area thereof becomes dark. Consequently, the OHS illuminating light distribution pattern PH represents the light distribution pattern in which the central area is bright appropriately and the area near the cut-off lines CL1, CL2 becomes dark, which is suitable for illuminating the overhead sign OHS.

In this modified example, in the high-beam light distribution pattern PH7 shown in FIG. 20(a), it is possible to form an intermediate light distribution pattern similar to the intermediate light distribution pattern PM5 of the above-described embodiment by omitting a part of the eleven light distribution patterns Pg which form the additional light distribution pattern PG.

In this modified example, the additional high-beam light distribution pattern PG can be formed by the plurality of types of illumination patterns with the compact configuration.

In addition, by adopting the configuration of this modified example, the light distribution pattern having the OHS illuminating light distribution pattern PH can be formed as the low-beam light distribution pattern PL7.

In particular, in the case of the plurality of light emitting units 230 being disposed to be aligned in parallel in the transverse direction below the rear focal point F of the projection lens 12 as in this modified example, since it becomes difficult to dispose the reflecting member for forming the OHS illuminating light distribution pattern PH by reflecting the reflected light from the reflector 16 ahead of the shade 20 as in the conventional technique, it is effective to adopt the configuration of this modified example.

In the above-described embodiment, it is also possible to form an OHS illuminating light distribution pattern which is similar to the OHS illuminating light distribution pattern PH by adopting an illumination mode similar to that of this modified example in forming the low-beam light distribution pattern PL5.

Next, a third modified example of the second embodiment will be described.

Figure 21:
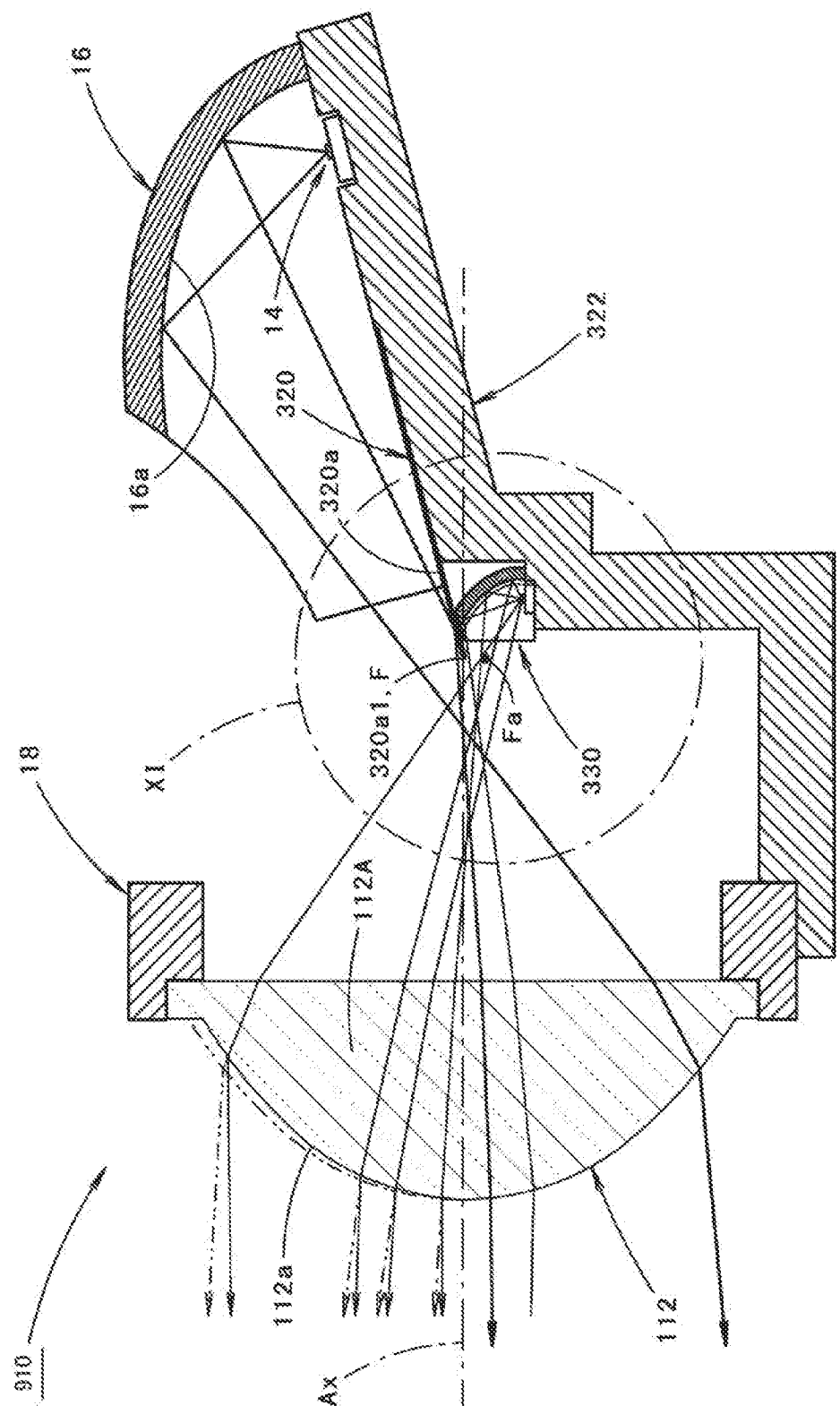
FIG. 21 is a view similar to FIG. 12, which shows a vehicle lamp according to a third modified example of the second embodiment.
Figure 22:
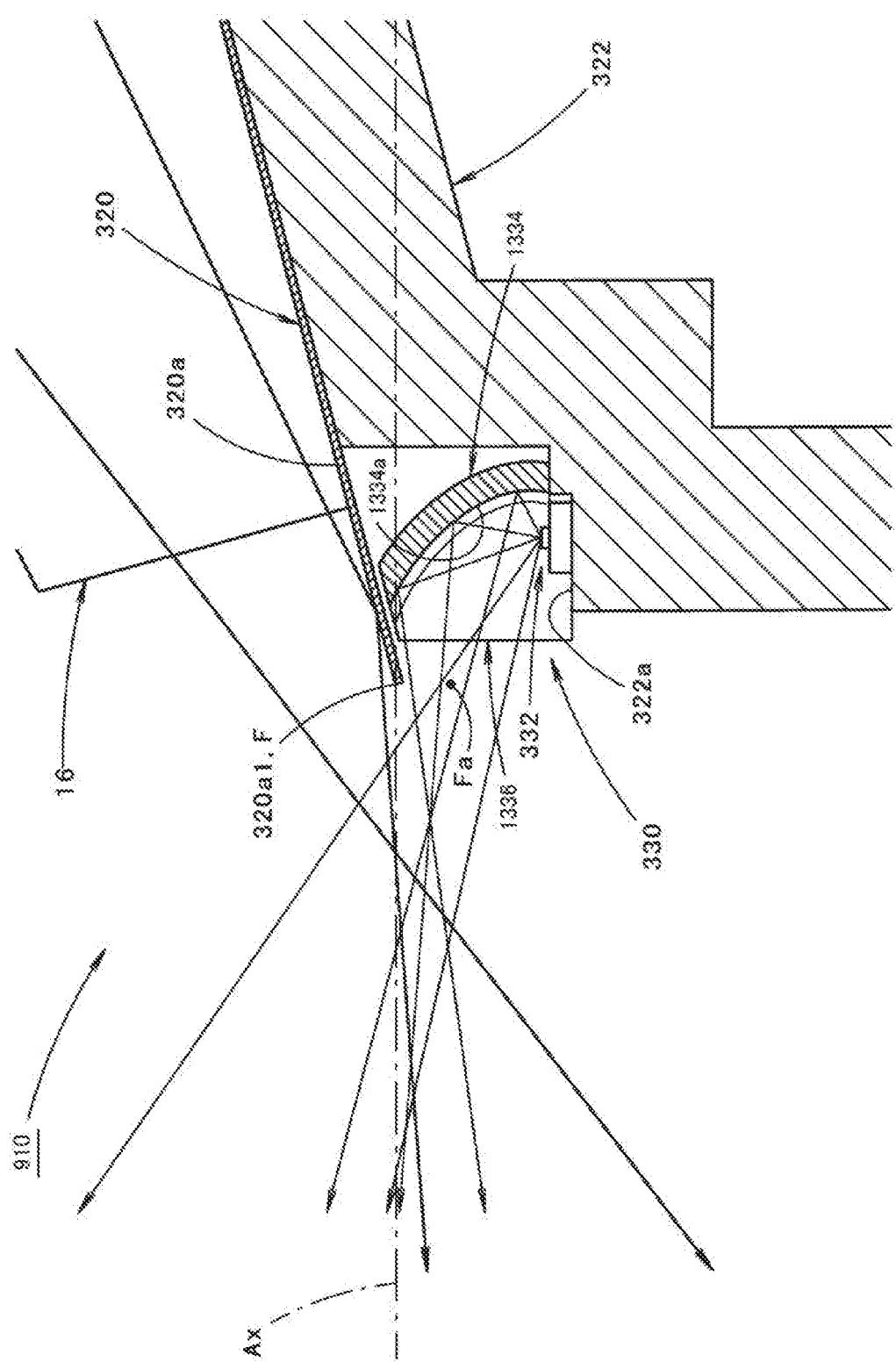
FIG. 22 is a detailed view of a portion denoted as XI in FIG. 21.

FIG. 21 is a view similar to FIG. 12, which shows a vehicle lamp 910 according to this modified example, and FIG. 22 is a detailed view of a portion of the vehicle lamp 910 which is denoted as XI in FIG. 21.

As shown in these drawings, a basic configuration of this vehicle lamp 910 is similar to that of the vehicle lamp 710 of the above-described first modified example but is different in that arrangement of the light emitting element 14 and the reflector 16 and the configuration of the shade 320 and individual light emitting units 330 are different from those of the corresponding constituent members of the first modified example and in that the shape of a base member 322 is different from that of the base member 322 of the above-described first modified example as well.

That is, the shade 320 of this modified example is made of a thin plate (for example, a metallic plate) whose thickness ranges from on the order of 0.2 to 0.5 mm, and an upper surface thereof is configured as an upwardly facing reflecting surface 320a. This shade 320 is supported on the base member 322 while being disposed so as to extend obliquely upwards and rearwards from the vicinity of the rear focal plane of the projection lens 112. In this case, an inclination angle of the upwardly facing reflecting surface 320a from a horizontal plane is set at a value of about 10 to 30°, and the position of a front end edge 320a1 thereof is set substantially at the same position as that of the above-described first modified example.

The configurations of the light emitting element 14 and the reflector 16 are similar to those of the first modified example. However, the light emitting element 14 and the reflector 16 are disposed to be inclined at an angle corresponding to the inclination angle of the upwardly facing reflecting surface 320a of the shade 320 from the horizontal plane. It is noted that with the inclination angle of this magnitude, light emitted from the light emitting element 14 and then reflected by the reflector 16 passes an area on the rear focal plane of the projection lens 112 which is almost the same as that in the above-described first modified example.

In this modified example, eleven light emitting units 330 are also disposed to be aligned in parallel at equal intervals in the transverse direction below the rear focal point F of the projection lens 112, and the eleven light emitting units 330 are configured to be lit individually.

The light emitting units 330 are disposed below a front end portion of the shade 320. Then, a unit support portion 322a which supports the light emitting units 330 is formed at a front end upper portion of the base member 322.

Each light emitting unit 330 includes a light emitting element 332 and a reflector 1334 which reflects light emitted from the light emitting element 332 towards the projection lens 112.

The light emitting element 332 is a white light emitting diode and is supported on the base member 322 with its light emitting surface disposed to face upwardly.

The reflector 1334 is disposed to cover the light emitting element 332 from the rear to top thereof and is supported on the base member 322.

The reflector 1334 has an ellipsoidal reflecting surface 1334a with a first focal point at a light emitting center of the light emitting element 332. The reflector 1334 reflects light from the light emitting element 332 to the front on a reflecting surface 1334a thereof so as to converge temporarily at the front of the rear focal plane of the projection lens 112, and then, the light is eventually incident on the projection lens 112.

The reflector 1334 is formed such that an upper end edge thereof extends as near as a lower surface of a front end portion of the shade 320 (that is, further upwards than the optical axis Ax), so that the reflecting surface 1334a is attempted to be ensured over as a wide area as possible.

As to the eleven light emitting units 330, the reflectors 1334 are formed integrally with one another. A partition wall 1336 is disposed on each side of each reflector 1334 to extend in a vertical direction which is parallel to the optical axis Ax. The partition walls 1336 are formed integrally with each reflector 1334.

Each partition wall 1336 is formed such that its upper end edge extends as near as the lower surface of the front end portion of the shade 320, and a front end edge of the partition wall 1336 is positioned slightly behind the rear focal plane of the projection lens 112. A side surface of each partition wall 1336 which face the reflecting surface 1334a of the corresponding reflector 1334 is configured as a reflecting surface.

Light emitted from each light emitting unit 330 to be incident on the projection lens 122 includes reflected light from the reflector 1334, direct light emitted directly from the light emitting element 332 and reflected light reflected from the partition walls 1336 on both the sides of the light emitting unit 330.

Figure 23:
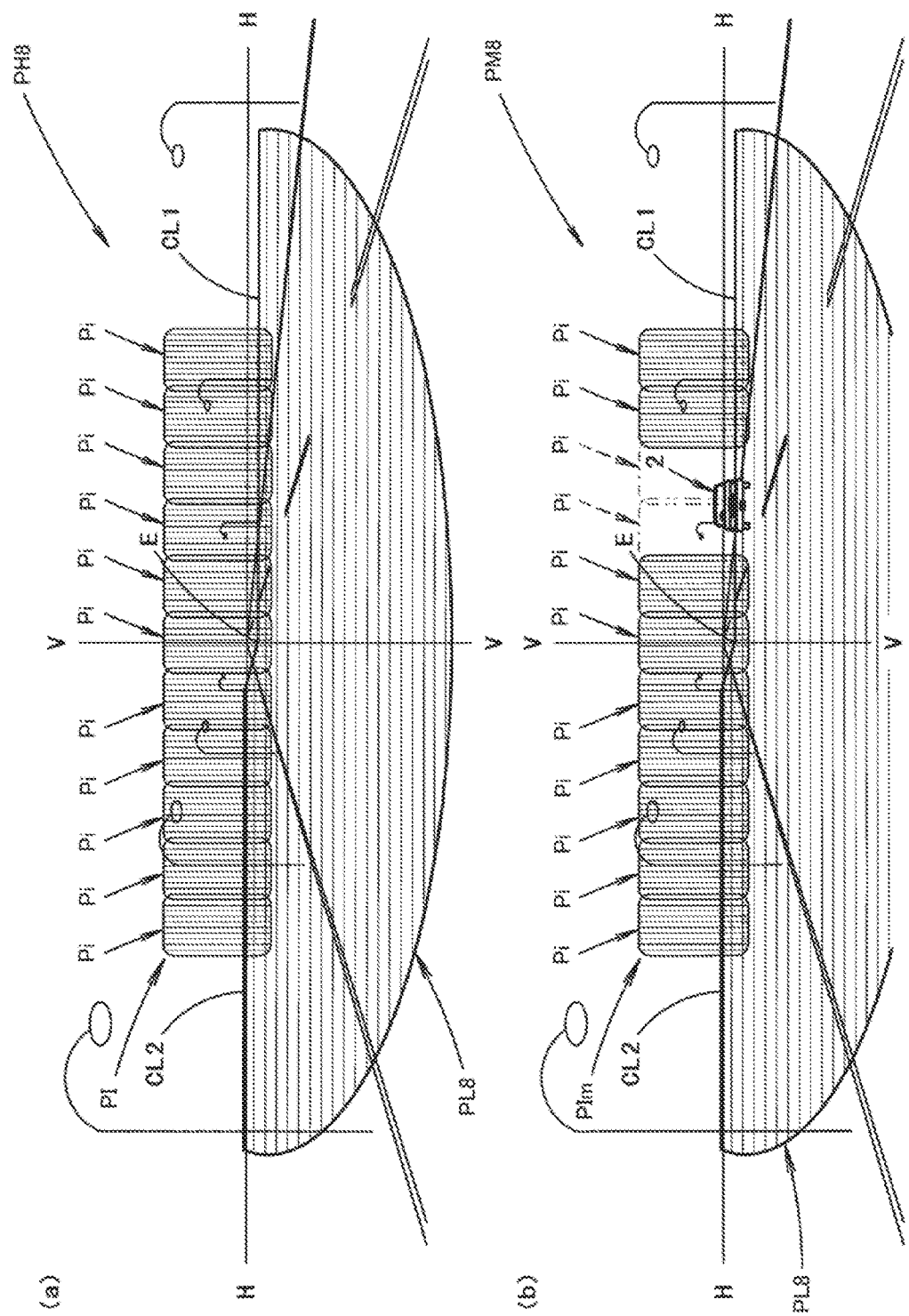
FIG. 23 is a view similar to FIG. 16, which shows operations of the third modified example.

FIG. 23 is a view showing light distribution patterns in a perspective manner which are formed on the imaginary vertical screen by light emitted forwards from the vehicle lamp 910. FIG. 23(a) is a view showing a high-beam light distribution pattern PH8, and FIG. 23(b) is a view showing an intermediate light distribution pattern PM8.

The high-beam light distribution pattern PH8 shown in FIG. 23(a) is formed as a combined light distribution pattern of a low-beam light distribution pattern PL8 and an additional high-beam light distribution pattern PI.

The additional light distribution pattern PI is formed as a combined light distribution pattern of eleven light distribution patterns Pi.

The light distribution patterns Pi are light distribution patterns which are formed as reverted projected images of light source images of the individual light emitting elements 332 which are formed on the rear focal plane of the projection lens 112 by light emitted individually from the light emitting units 330.

In this case, the light distribution patterns Pi are formed in the same shape and arrangement as those of the light distribution patterns Pj of the above-described first modified example. However, the light distribution patterns Pi are formed as the light distribution patterns which are brighter as a whole. This is because in each light emitting unit 330, more of the reflected light from the reflector 1334 and the direct light directly emitted from the light emitting element 332 can be incident on the projection lens 112.

The low-beam light distribution pattern PL8 has a substantially similar shape to that of the low-beam light distribution pattern PL6 in the above-described first modified example.

The intermediate light distribution pattern PM8 shown in FIG. 23(b) is a light distribution pattern having an additional light distribution pattern PIm which is partially not illuminated, in place of the additional light distribution pattern PI which forms the high-beam light distribution pattern PH8.

In this modified example, the additional high-beam light distribution patterns PI, PIm can be formed by the plurality of types of light distribution patterns with the compact configuration.

In particular, as in this modified example, the shade 320 which is formed of the thin plate is disposed such that the upwardly facing reflecting surface 320a extends obliquely upwards and rearwards from the vicinity of the rear focal plane of the projection lens 112, and then, the light emitting units 330 are disposed below the front end portion of the shade 320, so that the additional light distribution patterns PI, PIm can be made brighter.

In this modified example, since the rear focal point Fa of the upper area 112A of the projection lens 112 is positioned below the rear focal point F of the general area, even though a slight gap (that is, a gap equal to the thickness of the shade 320) is generated in the area on the rear focal plane of the projection lens 112 where light passes by the reflection light from the reflector 16 and the light emitted from the light emitting units 330, in the high-beam light distribution pattern PH8, the low-beam light distribution pattern PL8 and the additional light distribution pattern PI can be partially overlapped with each other. Accordingly, it is possible to enhance the continuity between the low-beam light distribution pattern PL8 and the additional light distribution pattern PI.

This will be true with the intermediate light distribution pattern PM8, and the continuity between the low-beam light distribution pattern PL8 and the additional light distribution pattern PIm can be enhanced.

In this modified example, the reflector 1334 of each light emitting unit 330 extends further upwards than the optical axis Ax at the upper end edge thereof, and light emitted from each light emitting unit 330 passes the rear focal plane of the projection lens 112 below the rear focal point F. Consequently, it can be said that the light emitting units 330 are positioned below the rear focal point F of the projection lens 112.

Next, a fourth modified example of the second embodiment will be described.

Figure 24:
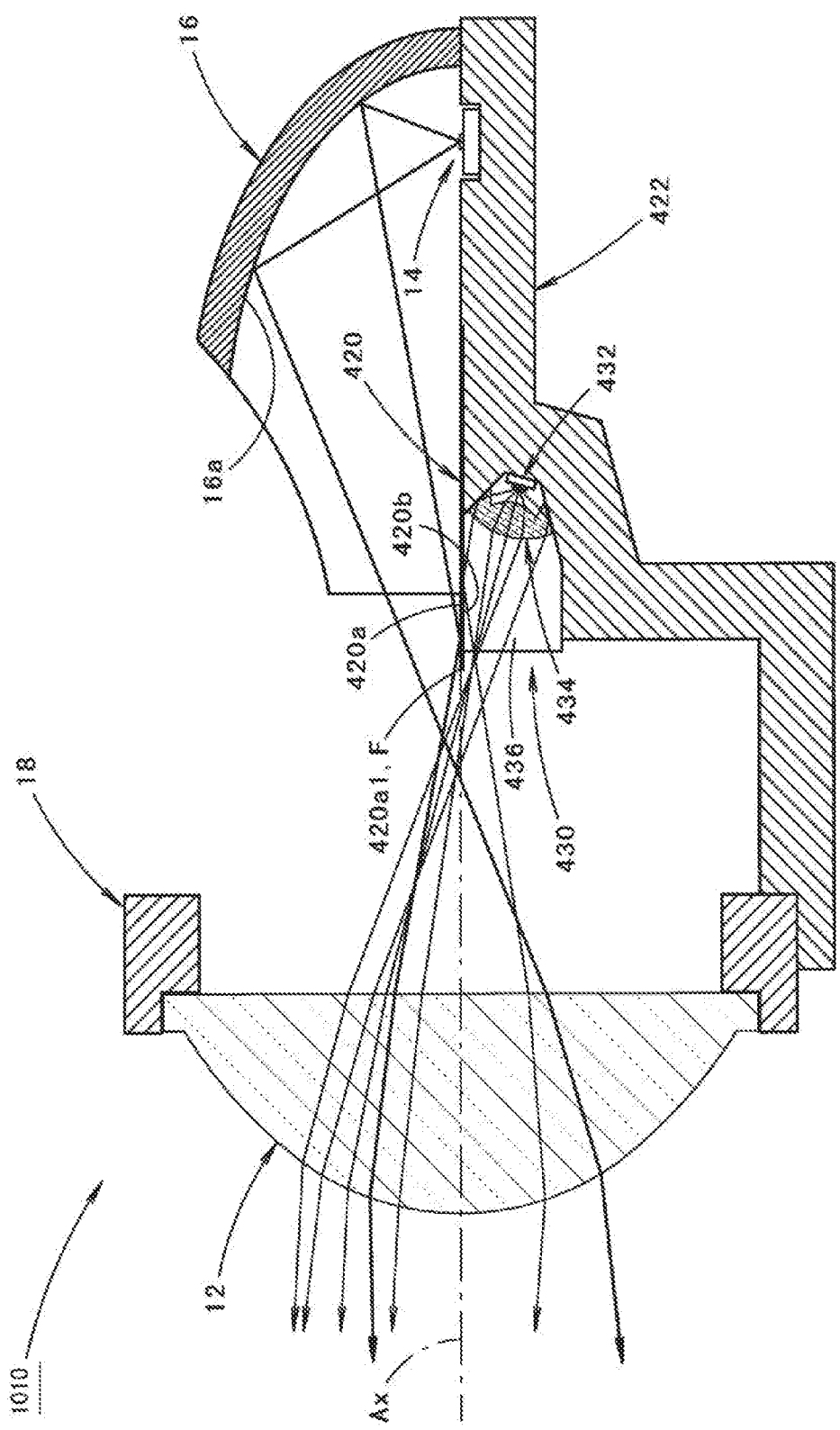
FIG. 24 is a view similar to FIG. 12, which shows a vehicle lamp according to a fourth modified example of the second embodiment.

FIG. 24 is a view similar to FIG. 12, which shows a vehicle lamp 1010 according to this modified example.

As shown in FIG. 24, a basic configuration of the vehicle lamp 1010 is similar to that of the vehicle lamp 610 of the second embodiment but the configurations of a shade 420 and light emitting units 430 are different from those in the second embodiment, a base member 422 is different from that in the above-described second embodiment as well.

That is, the shade 420 of this modified example is made of a thin plate (for example, a metallic plate) whose thickness ranges from on the order of 0.2 to 0.5 mm, and an upper surface thereof is configured as an upwardly facing reflecting surface 420a, while a lower surface thereof is configured as a downwardly facing reflecting surface 420b.

This shade 420 is disposed to extend horizontally in the longitudinal direction, and a front end edge 420a1 of the upwardly facing reflecting surface 420a is set at the same position as the position of the above-described embodiment. This shade 420 is supported on the base member 422.

In this modified example, eleven light emitting units 430 are disposed to be aligned in parallel at equal intervals in the transverse direction below the rear focal point F of the projection lens 12 and are configured to be lit individually.

Each light emitting unit 430 includes a light emitting element 432 and a lens 434 which emits light emitted from the light emitting element 432 towards the projection lens 12 while deflecting the light.

The light emitting elements 432 are disposed such that the light emitting surfaces are directed obliquely upwards relative to the direction of the front of the lamp below the shade 420 and are supported on the base member 422.

Each lens 434 is a convex cylindrical lens which extends short in the transverse direction. A front surface of the convex cylindrical lens is formed into a single convex curved surface, and a rear surface thereof is formed into a stepped convex curved surface.

The lenses 434 are disposed obliquely upwards and forwards of the corresponding light emitting elements 432 such that the optical axes are directed obliquely upwards and forwards, so that light emitted from the individual light emitting elements 432 is transmitted therethrough towards the projection lens 12 while being deflected. In this case, in each lens 434, a deflection control is performed directly on light emitted from each light emitting element 432 at a central portion, and the light on which the deflection control is performed directly is temporarily converged to a position near below the rear focal point F of the projection lens 12. On the other hand, at an upper portion and a lower portion of the lens 434, light emitted from each light emitting element 432 is totally reflected on a rear surface, and thereafter, the deflection control is performed on the reflected light.

In addition, a part of light emitted from each lens 434 is reflected on the downwardly facing reflecting surface 420b of the shade 420 and is then incident on the projection lens 12.

As to the eleven light emitting units 430, a partition wall 436 is disposed on each side of the lens 434 to extend in a vertical direction which is parallel to the optical axis Ax. The partition walls 436 are supported on the base member 422.

The partition walls 436 are positioned slightly behind the rear focal plane of the projection lens 12 at front end edges thereof. A side surface of each partition wall 436 which faces the lens 434 is configured as a reflecting surface.

Figure 25:
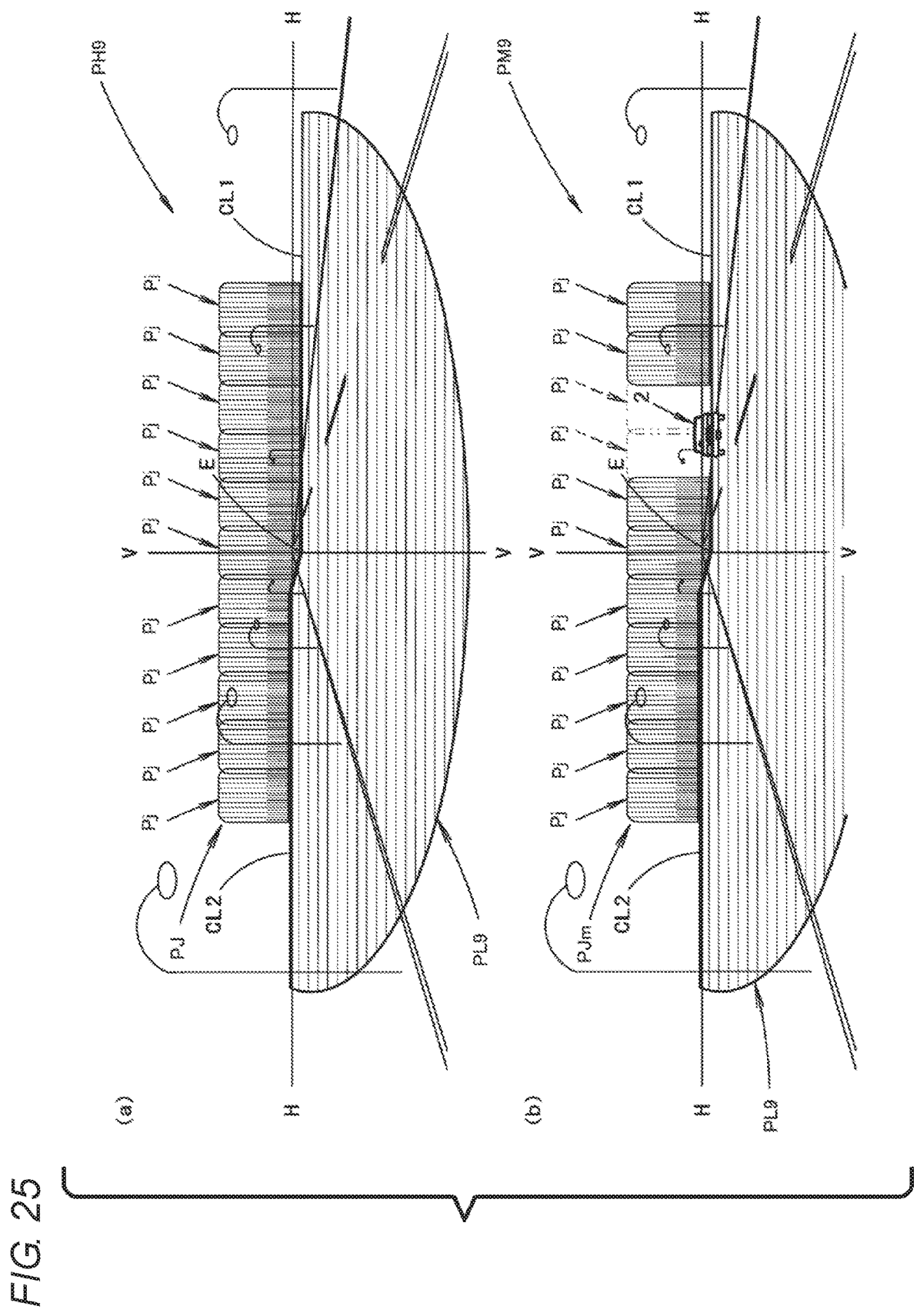
FIG. 25 is a view similar to FIG. 16, which shows operations of the fourth modified example.

FIG. 25 is a view showing light distribution patterns in a perspective manner which are formed on the imaginary vertical screen by light emitted forwards from the vehicle lamp 1010. FIG. 25(a) is a view showing a high-beam light distribution pattern PH9, and FIG. 25(b) is a view showing an intermediate light distribution pattern PM9.

The high-beam light distribution pattern PH9 shown in FIG. 25(a) is formed as a combined light distribution pattern of a low-beam light distribution pattern PL9 and an additional high-beam light distribution pattern PJ.

The low-beam light distribution pattern PL9 has a similar shape to that of the low-beam light distribution pattern PL5 of the above-described embodiment.

The additional light distribution pattern PJ is formed as a combined light distribution pattern of 11 light distribution patterns Pj.

The light distribution patterns Pj are light distribution patterns which are formed as reverted projected images of light source images of the individual light emitting elements 432 which are formed on the rear focal plane of the projection lens 12 by light emitted individually from the light emitting units 430.

In this case, these light distribution patterns Pj are formed in the same shape and arrangement as those of the light distribution patterns Pe of the above-described embodiment. However, lower end edges thereof are formed in a position which is spaced away slightly upwards from the cut-off lines CL1, CL2. This is because the slight gap (that is, the gap equal to the thickness of the shade 420) is generated in the area of the rear focal plane of the projection lens 12 where light passes by the reflected light from the reflector 16 and the emitted light from the light emitting units 430.

On the other hand, the light distribution patterns Pj are formed as the light distribution patterns where portions near above the cut-off lines CL1, CL2 are bright. This is because a part of light emitted from the light emitting units 430 converged to the position near below the rear focal point F of the projection lens 12.

The intermediate light distribution pattern PM9 shown in FIG. 25(a) is a light distribution pattern having an additional light distribution pattern PJm which is partially not illuminated, in place of the additional light distribution pattern PJ which forms the high-beam light distribution pattern PH9.

In this modified example, similar operational effects to that of the second embodiment can be obtained.

In this modified example, a part of light emitted from the light emitting units 430 converge at the position near below the rear focal point F of the projection lens 12, and therefore, the light distribution pattern formed by the light emitted from the light emitting units 430 can be formed as the light distribution pattern in which the portions above the cut-off lines CL1, CL2 of the low-beam light distribution pattern PL9 are bright.

In the configuration of this modified example, if the projection lens 112 of the first modified example is used in place of the projection lens 12, in the high-beam light distribution pattern PH9, the low-beam light distribution pattern PL9 and the additional light distribution pattern PJ can be partially overlapped with each other, so that it is possible to enhance the continuity therebetween.

Next, a fifth modified example of the second embodiment will be described.

Figure 26:
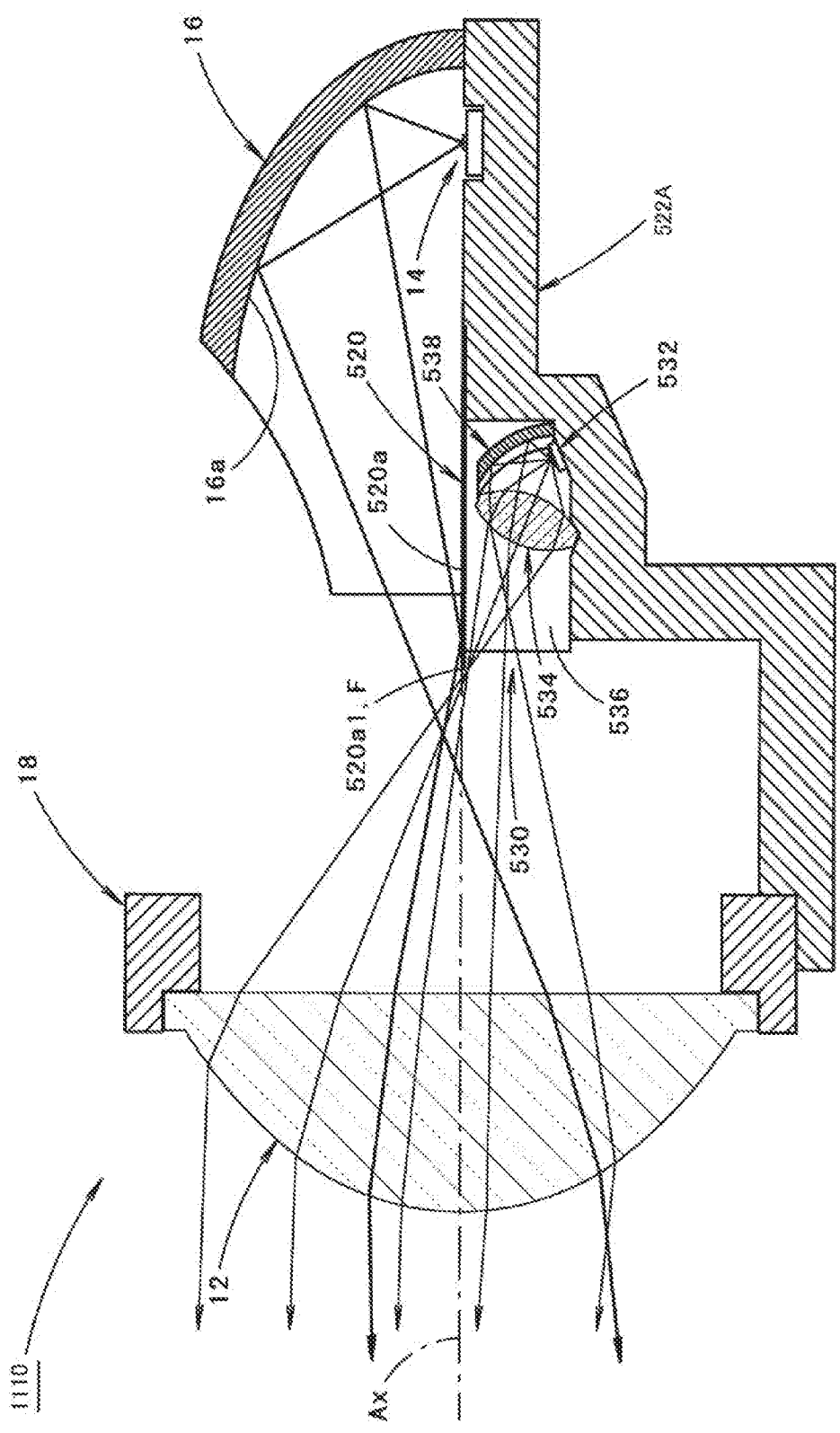
FIG. 26 is a view similar to FIG. 12, which shows a vehicle lamp according to a fifth modified example of the second embodiment.

FIG. 26 is a view similar to FIG. 12, which shows a vehicle lamp 1110 according to this modified example.

As shown in FIG. 26, a basic configuration of the vehicle lamp 1110 is similar to that of the vehicle lamp 610 of the second embodiment but the configurations of a shade 520 and light emitting units 530 are different from those in the second embodiment, and the shape of a base member 522A is different from that in the above-described second embodiment as well.

That is, the shade 520 of this modified example is made of a thin plate (for example, a metallic plate) whose thickness ranges from on the order of 0.2 to 0.5 mm, and an upper surface thereof is configured as an upwardly facing reflecting surface 520a.

This shade 520 is disposed to extend horizontally in the longitudinal direction, and a front end edge 520a1 of the upwardly facing reflecting surface 520a is set at the same position as the position of the above-described embodiment. This shade 520 is supported on the base member 522A.

In this modified example, eleven light emitting units 530 are disposed to be aligned in parallel at equal intervals in the transverse direction below the rear focal point F of the projection lens 12 and are configured to be lit individually.

Each light emitting unit 530 includes a light emitting element 532, a lens 534 which emits light emitted from the light emitting element 532 towards the projection lens 12 while deflecting the light and a reflector 538 which is disposed behind the lens 534.

The light emitting elements 532 are disposed such that the light emitting surfaces are directed obliquely upwards relative to the direction of the front of the lamp below the shade 520 and are supported on the base member 522A.

Each lens 534 is a convex cylindrical lens which extends short in the transverse direction. Both a front surface and a rear surface of the convex cylindrical lens are formed into a single convex curved surface.

The lenses 534 are disposed obliquely upwards and forwards of the corresponding light emitting elements 532 such that the optical axes are directed obliquely upwards and forwards, so that light emitted from the individual light emitting elements 532 is transmitted therethrough towards the projection lens 12 while being deflected. In this case, each lens 534 temporarily converges light emitted from each light emitting element 532 to a position near below the rear focal point F of the projection lens 12.

Each reflector 538 reflects light emitted from each light emitting element 532 to the front to be incident on the corresponding lens 534. The reflectors 538 are supported on the base member 522A.

As to the eleven light emitting units 530, a partition wall 536 is disposed on each side of the lens 534 and the reflector 538 to extend in a vertical direction which is parallel to the optical axis Ax. The partition walls 536 are supported on the base member 522A.

The partition walls 536 are positioned slightly behind the rear focal plane of the projection lens 12 at front end edges thereof. Side surfaces of each partition wall 536 which face the lens 534 and the reflector 538 are configured as a reflecting surface.

In this modified example, it is possible to form an additional high-beam light distribution pattern similar to that of the fourth modified example.

By adopting the configuration of this modified example, more of light emitted from the light emitting units 530 is allowed to pass the rear focal plane of the projection lens 12 in the position near below the rear focal point F of the projection lens 12. Therefore, it is possible to form the additional light distribution pattern as the light distribution pattern in which the portions near above the cut-off lines CL1, CL2 of the low-beam light distribution pattern are brighter.

In this modified example, it is possible to use the projection lens 112 of the first modified example in place of the projection lens 12.

The numeric values used as specifications in the embodiments and the like are mere examples, and these values may, of course, be set at appropriate different values.

The present invention is not limited to the configurations described in the embodiments and the like, and hence, other various altered or modified configurations than those described configurations may be adopted.

This application is based on the Japanese Patent Application No. 2014-161154 filed on Aug. 7, 2014 and the Japanese Patent Application No. 2014-161155 filed on Aug. 7, 2014, the contents of which are incorporated herein by reference.

The invention claimed is:

1. A vehicle lamp configured to selectively perform low beam illumination and high beam illumination,
    wherein the vehicle lamp comprises a projection lens, and a light source which is disposed behind the projection lens and is configured to emit light forwards through the projection lens,
    wherein a shade and a plurality of light emitting elements are disposed behind the projection lens, the shade being configured to cut off a part of light which is emitted from the light source to be directed towards the projection lens to form a low-beam light distribution pattern, the plurality of light emitting elements being configured to emit light which enters the projection lens to form an additional high-beam light distribution pattern to be added to the low-beam light distribution pattern, and
    wherein the plurality of light emitting elements are disposed to be aligned in a transverse direction below a rear focal point of the projecting lens and are configured to be lit individually,
    wherein the plurality of light emitting elements are disposed with their light emitting surfaces facing a front of the vehicle lamp or with their light emitting surfaces directed obliquely upwards with respect to a direction to the front of the vehicle lamp.

2. The vehicle lamp according to claim 1,
    wherein the shade is formed to extend obliquely upwards and rearwards from a vicinity of a rear focal plane of the projection lens, and
    wherein the plurality of light emitting elements are disposed behind a front end edge of the shade.

3. The vehicle lamp according to claim 1,
    wherein the projection lens is formed such that a rear focal point of an upper area of the projection lens is positioned below a rear focal point of a general area of the projection lens which is an area other than the upper area.

4. The vehicle lamp according to claim 1, wherein when the plurality of light emitting elements are disposed with their light emitting surfaces facing the front of the vehicle lamp, the light emitting surfaces directly face the front of the vehicle lamp.

5. The vehicle lamp according to claim 1, wherein the plurality of light emitting elements are supported by a front surface portion of a base member which has at least a part thereof directly facing the front of the vehicle lamp.

6. The vehicle lamp according to claim 1, wherein the projection lens is supported by a lens holder at an outer circumferential flange portion thereof, and wherein the plurality of light emitting elements are disposed inwards in a radial direction from the lens holder.

* * * * *